(12) United States Patent
Olvera et al.

(10) Patent No.: US 12,502,079 B2
(45) Date of Patent: Dec. 23, 2025

(54) INSTRUMENT RESPONSE FUNCTION MONITOR ON AN OPTICAL MEASUREMENT DEVICE

(71) Applicant: HI LLC, Los Angeles, CA (US)

(72) Inventors: Isai Olvera, South Portland, ME (US); Han Yong Ban, Los Angeles, CA (US); Dakota Blue Decker, Los Angeles, CA (US); Yaroslav Chekin, Venice, CA (US); Joshua Schmidt, Los Angeles, CA (US); Ryan Field, Culver City, CA (US)

(73) Assignee: HI LLC, Culver City, CA (US)

( * ) Notice: Subject to any disclaimer, the term of this patent is extended or adjusted under 35 U.S.C. 154(b) by 112 days.

(21) Appl. No.: 18/511,742

(22) Filed: Nov. 16, 2023

(65) Prior Publication Data
US 2024/0164646 A1 May 23, 2024

Related U.S. Application Data

(60) Provisional application No. 63/426,189, filed on Nov. 17, 2022.

(51) Int. Cl.
*A61B 5/00* (2006.01)
(52) U.S. Cl.
CPC .......... *A61B 5/0075* (2013.01); *A61B 5/0042* (2013.01); *A61B 2562/0238* (2013.01); *A61B 2562/046* (2013.01)
(58) Field of Classification Search
CPC .............. A61B 5/0075; A61B 5/0042; A61B 2562/0238; A61B 2562/046
See application file for complete search history.

(56) References Cited

U.S. PATENT DOCUMENTS

| | | | |
|---|---|---|---|
| 5,813,403 A | * | 9/1998 | Soller ............... A61B 5/14539 600/310 |
| 5,853,370 A | | 12/1998 | Chance et al. |
| 6,240,309 B1 | | 5/2001 | Yamashita et al. |
| 6,384,663 B2 | | 5/2002 | Cova et al. |
| 6,640,133 B2 | | 10/2003 | Yamashita et al. |
| 6,683,294 B1 | | 1/2004 | Herbert et al. |
| 7,356,365 B2 | | 4/2008 | Schurman |

(Continued)

OTHER PUBLICATIONS

Alayed, et al., Characterization of a Time-Resolved Diffuse Optical Spectroscopy Prototype Using Low-Cost, Compact Single Photon Avalanche Detectors for Tissue Optics Applications, Sensors 2018, 18, 3680; doi: 10.3390/s18113680, Oct. 29, 2018.

(Continued)

*Primary Examiner* — Sean A Frith
(74) *Attorney, Agent, or Firm* — ALG Intellectual Property, LLC

(57) ABSTRACT

An illustrative optical measurement system may include a module comprising a light source configured to emit light directed at a target, a plurality of detectors configured to detect target photon arrival times of target photons of the light after the light is scattered by the target, and a reference detector configured to detect reference photon arrival times of reference photons of the light after the light is reflected within the module. The system may further include a controller configured to determine, based on an output from the reference detector, an instrument response function (IRF) of the module.

24 Claims, 19 Drawing Sheets

(56) References Cited

U.S. PATENT DOCUMENTS

| | | |
|---|---|---|
| 7,547,872 B2 | 6/2009 | Niclass et al. |
| 7,774,047 B2 | 8/2010 | Yamashita et al. |
| 8,026,471 B2 | 9/2011 | Itzler |
| 8,078,250 B2 | 12/2011 | Chen et al. |
| 8,082,015 B2 | 12/2011 | Yodh et al. |
| 8,633,431 B2 | 1/2014 | Kim |
| 8,817,257 B2 | 8/2014 | Herve |
| 9,058,081 B2 | 6/2015 | Baxter |
| 9,076,707 B2 | 7/2015 | Harmon |
| 9,131,861 B2 | 9/2015 | Ince et al. |
| 9,316,735 B2 | 4/2016 | Baxter |
| 9,401,448 B2 | 7/2016 | Bienfang et al. |
| 9,419,635 B2 | 8/2016 | Kumar et al. |
| 9,442,201 B2 | 9/2016 | Schmand et al. |
| 9,529,079 B1 | 12/2016 | Droz et al. |
| 9,574,936 B2 | 2/2017 | Heinonen |
| 9,946,344 B2 | 4/2018 | Ayaz et al. |
| D817,553 S | 5/2018 | Aaskov et al. |
| D825,112 S | 8/2018 | Saez |
| 10,158,038 B1 | 12/2018 | Do et al. |
| 10,340,408 B1 | 7/2019 | Katnani et al. |
| 10,424,683 B1 | 9/2019 | Valle et al. |
| 10,515,993 B2 | 12/2019 | Field et al. |
| 10,697,829 B2 | 6/2020 | Delic |
| 10,772,561 B2 | 9/2020 | Donaldson |
| 10,809,796 B2 | 10/2020 | Armstrong-Muntner et al. |
| 10,912,504 B2 | 2/2021 | Nakaji et al. |
| 11,006,876 B2 | 5/2021 | Johnson et al. |
| 11,006,878 B2 | 5/2021 | Johnson et al. |
| 2007/0083097 A1 | 4/2007 | Fujiwara et al. |
| 2009/0012402 A1 | 1/2009 | Mintz et al. |
| 2011/0208675 A1 | 8/2011 | Shoureshi et al. |
| 2012/0232362 A1* | 9/2012 | Gable ............... A61B 5/14532 600/310 |
| 2013/0342835 A1 | 12/2013 | Blacksberg |
| 2014/0191115 A1 | 7/2014 | Webster et al. |
| 2014/0217264 A1 | 8/2014 | Shepard et al. |
| 2014/0275891 A1 | 9/2014 | Muehlemann et al. |
| 2015/0038811 A1 | 2/2015 | Asaka et al. |
| 2015/0041625 A1 | 2/2015 | Dutton et al. |
| 2015/0054111 A1 | 2/2015 | Niclass et al. |
| 2015/0077279 A1 | 3/2015 | Song et al. |
| 2015/0150505 A1 | 6/2015 | Kaskoun et al. |
| 2015/0327777 A1 | 11/2015 | Kostic et al. |
| 2015/0364635 A1 | 12/2015 | Bodlovic et al. |
| 2016/0139046 A1* | 5/2016 | Baltz ................... G01N 27/07 29/428 |
| 2017/0030769 A1 | 2/2017 | Clemens et al. |
| 2017/0052065 A1 | 2/2017 | Sharma et al. |
| 2017/0176596 A1 | 6/2017 | Shpunt et al. |
| 2017/0179173 A1 | 6/2017 | Mandai et al. |
| 2017/0202518 A1 | 7/2017 | Furman et al. |
| 2017/0281086 A1 | 10/2017 | Donaldson |
| 2017/0363467 A1 | 12/2017 | Clemens et al. |
| 2017/0367650 A1 | 12/2017 | Wallois et al. |
| 2018/0014741 A1 | 1/2018 | Chou |
| 2018/0027196 A1 | 1/2018 | Yang et al. |
| 2018/0033751 A1 | 2/2018 | Ban et al. |
| 2018/0039053 A1 | 2/2018 | Kremer et al. |
| 2018/0070830 A1 | 3/2018 | Sutin et al. |
| 2018/0070831 A1 | 3/2018 | Sutin et al. |
| 2018/0089848 A1 | 3/2018 | Yang et al. |
| 2019/0083010 A1* | 3/2019 | Lee ..................... A61B 5/7246 |
| 2019/0113385 A1 | 4/2019 | Fukuchi |
| 2019/0175068 A1 | 6/2019 | Everdell |
| 2019/0187254 A1* | 6/2019 | Kappel ................ G01S 7/4808 |
| 2019/0212761 A1* | 7/2019 | Swanson ............ A61B 5/0075 |
| 2019/0246963 A1* | 8/2019 | Chung ............... A61B 5/14532 |
| 2019/0355861 A1 | 11/2019 | Katnani et al. |
| 2019/0363210 A1 | 11/2019 | Valle et al. |
| 2019/0388018 A1 | 12/2019 | Horstmeyer et al. |
| 2020/0060542 A1 | 2/2020 | Alford et al. |
| 2020/0116838 A1 | 4/2020 | Erdogan et al. |
| 2020/0196932 A1 | 6/2020 | Johnson et al. |
| 2020/0253479 A1 | 8/2020 | Nurmikko |
| 2020/0315510 A1 | 10/2020 | Johnson et al. |
| 2020/0337624 A1 | 10/2020 | Johnson et al. |
| 2020/0390358 A1 | 12/2020 | Johnson et al. |
| 2021/0259597 A1* | 8/2021 | Katnani ............ A61B 5/14553 |
| 2022/0370010 A1* | 11/2022 | Zilkie ................ G02B 6/12004 |
| 2022/0413143 A1* | 12/2022 | Parsa .................. G01S 7/4814 |

OTHER PUBLICATIONS

Ban, et al., Kernel Flow: a high channel count scalable TD-fNIRS system, https://www.spiedigitallibrary.org/conference-proceedings-of-spie Proc. of SPIE vol. 11663, 116630B doi: 10.1117/12.2582888, Mar. 5, 2021.

Ban, et al., Kernel Flow: a high channel count scalable time-domain functional near-infrared spectroscopy system, https://www.spiedigitallibrary.org/journals/Journal-of-Biomedical-Optics on Jan. 18, 2022.

Contini, et al., Photon migration through a turbid slab described by a model based on diffusion approximation. I. Theory, Appl. Opt. 36(19), 4587 (1997).

Di Sieno, et al., Probe-hosted large area silicon photomultiplier and high-throughput timing electronics for enhanced performance time-domain functional near-infrared spectroscopy, Biomed. Opt. Express 11(11), 6389 (2020).

Fishburn, et al., Temporal Derivative Distribution Repair (TDDR): A motion correction method for fNIRS, Neuroimage. Jan. 1, 2019; 184: 171-179. doi:10.1016/j.neuroimage.2018.09.025.

Huppert, et al., HomER: a review of time-series analysis methods for near-infrared spectroscopy of the brain, Appl. Opt. 48(10), D280 (2009).

Kienle, et al., Improved solutions of the steady-state and the time-resolved diffusion equations for reflectance from a semi-infinite turbid medium, J. Opt. Soc. Am. A 14(1), 246 (1997).

Konugolu, et al., Broadband (600-1350 nm) Time-Resolved Diffuse Optical Spectrometer for Clinical Use, IEEE Journal of Selected Topics in Quantum Electronics, vol. 22, No. 3, May/Jun. 2016.

Lacerenza, et al., Wearable and wireless time-domain near-infrared spectroscopy system for brain and muscle hemodynamic monitoring, Biomed. Opt. Express 11(10), 5934 (2020).

Lange, et al., Clinical Brain Monitoring with Time Domain NIRS: A Review and Future Perspectives, Applied Sciences 9(8), 1612 (2019).

Lange, et al., MAESTROS: A Multiwavelength Time-Domain NIRS System to Monitor Changes in Oxygenation and Oxidation State of Cytochrome-C-Oxidase, IEEE J. Select. Topics Quantum Electron. 25(1), 1-12 (2019).

Martelli, et al., Optimal estimation reconstruction of the optical properties of a two-layered tissue phantom from time-resolved single-distance measurements, Journal of Biomedical Optics 20(11), 115001 (Nov. 2015).

Mora, et al., Fast silicon photomultiplier improves signal harvesting and reduces complexity in time-domain diffuse optics, Opt. Express 23(11), 13937 (2015).

Pifferi, et al., Performance assessment of photon migration instruments: the MEDPHOT protocol, Applied Optics, 44 (11), 2104-2114, 2005.

Prahl, Optical Absorption of Hemoglobin, http://omlc.ogi.edu/spectra/hemoglobin/index.html, 1999.

Re, et al., Multi-channel medical device for time domain functional near infrared spectroscopy based on wavelength space multiplexing, Biomed. Opt. Express 4(10), 2231 (2013).

Renna, et al., Eight-Wavelength, Dual Detection Channel Instrument for Near-Infrared Time-Resolved Diffuse Optical Spectroscopy, IEEE J. Select. Topics Quantum Electron. 25(1), 1-11 (2019).

Torricelli, et al., Time domain functional NIRS imaging for human brain mapping, NeuroImage 85, 28-50 (2014).

Wabnitz, et al., Depth-selective data analysis for time-domain fNIRS: moments vs. time windows, Biomed. Opt. Express 11(8), 4224 (2020).

Wabnitz, et al., Performance assessment of time-domain optical brain imagers, part 1: basic instrumental performance protocol, Journal of Biomedical Optics 19(8), 086010 (Aug. 2014).

(56) References Cited

OTHER PUBLICATIONS

Wabnitz, et al., Performance assessment of time-domain optical brain imagers, part 2: nEUROPt protocol, Journal of Biomedical Optics 19(8), 086012 (Aug. 2014).
Wojtkiewicz, et al., Self-calibrating time-resolved near infrared spectroscopy, Biomed. Opt. Express 10(5), 2657 (2019).
Zucchelli, et al., Method for the discrimination of superficial and deep absorption variations by time domain fNIRS, 2013 OSA Dec. 1, 2013 | vol. 4, No. 12 | DOI: 10.1364/BOE.4.002893 | Biomedical Optics Express 2893, 2013.

* cited by examiner

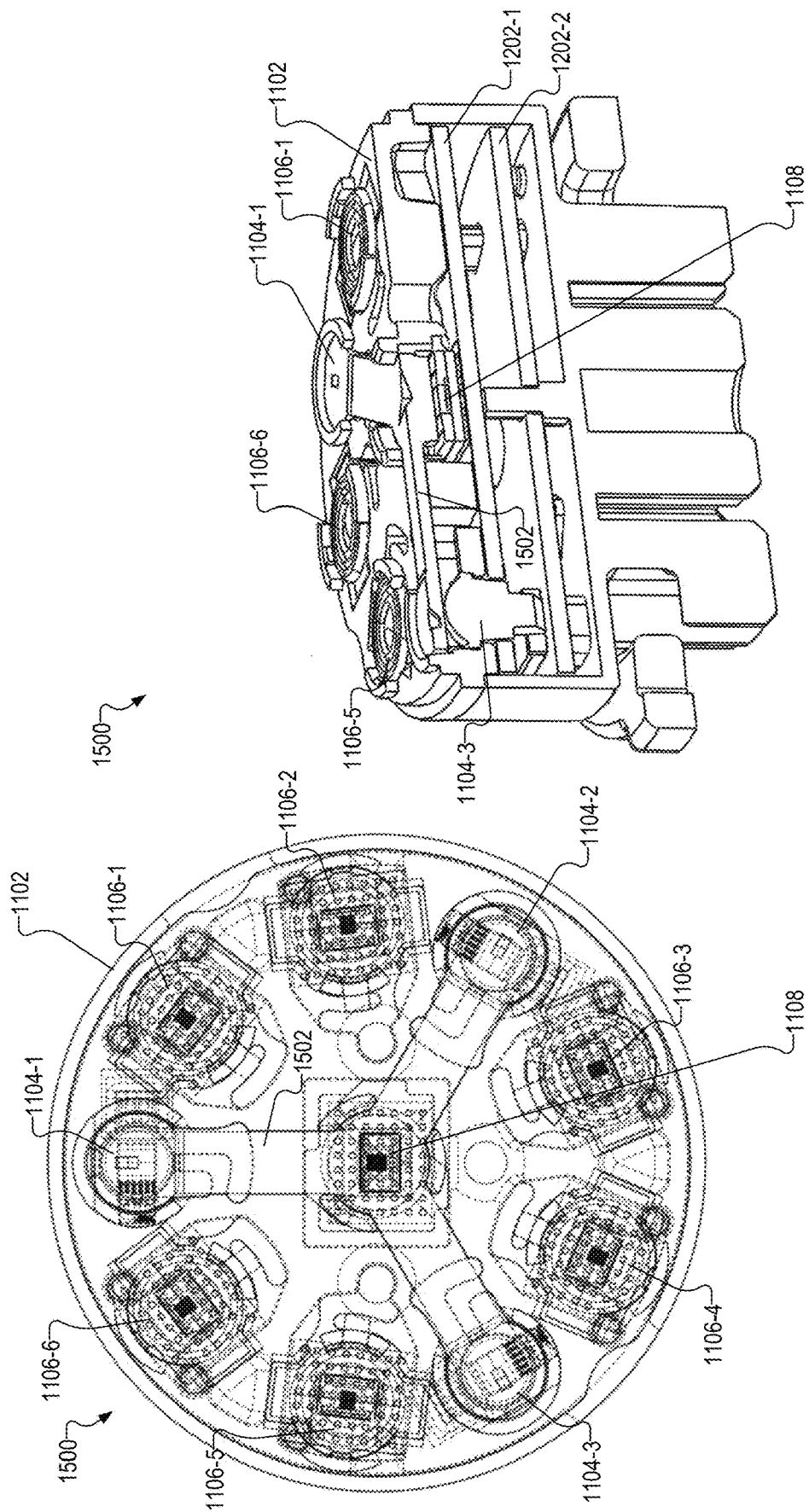

INSTRUMENT RESPONSE FUNCTION MONITOR ON AN OPTICAL MEASUREMENT DEVICE

RELATED APPLICATIONS

The present application claims priority under 35 U.S.C. § 119(e) to U.S. Provisional Patent Application No. 63/426,189, filed Nov. 17, 2022, and incorporated herein by reference in its entirety.

BACKGROUND INFORMATION

A time domain-based optical measurement device (e.g., a near-infrared spectroscopy (TD-NIRS) device) may be configured to perform an optical measurement by emitting picosecond pulses of light into tissue (e.g., brain, muscle, finger, etc.) and detecting arrival times of single photons at nearby detectors. The distribution of photon arrival times may be parameterized to estimate tissue optical properties and/or biological properties (e.g., blood oxygenation levels, blood volume levels, neural activities, etc.).

In some instances, it may be desirable to calibrate the optical measurement device for performing the optical measurement. As an example, the optical measurement device may detect biological properties by measuring the change in shape of laser pulses after they have passed through the tissue. The shape of laser pulses may include a temporal shape, as represented for example by a histogram generated by a time-to-digital converter (TDC) coupled to an output of a detector. To measure the change in the shape, a baseline shape of the laser pulse may be determined to calibrate the optical measurement device. In some scenarios, the baseline shape may change based on various conditions (e.g., temperature, humidity, currents applied to device components, etc.), which may result in a need to periodically calibrate the optical measurement device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 15C shows a top view of an illustrative module.
FIG. 15D shows an isometric view of an illustrative module.

DETAILED DESCRIPTION

An illustrative optical measurement system may include a module that includes one or more light sources configured to emit light toward a target (e.g., a body of a user). The module may further include a plurality of detectors configured to detect arrival times of photons after the light is scattered by the target. The module may further include a reference detector that is configured to detect arrival times of photons from the light emitted by the one or more light sources but reflected within the module, rather than scattered by the target. Based on the detected arrival times of the photons (e.g., reference photons) reflected within the detector, the system (e.g., one or more processors of the optical measurement system) may determine a histogram that represents an instrument response function (IRF) of the module.

As the reference detector may be dedicated to measure IRFs of the module while the system is in use, the system may be able to measure any real-time changes to the IRF that may occur while the system is in use. For instance, the IRF may change due to changes in environmental conditions, system conditions, etc. If such changes in the IRF are unaccounted for, measurements and analysis of measurements based on detected arrival times of photons (e.g., target photons) scattered by the target may become inaccurate.

Thus, the principles described herein may result in improved and more accurate determination of characteristics of the target than conventional systems and techniques. For example, by measuring the IRF with each measurement of light scattered by the target, any changes to the instrument response may be accurately accounted for and considered in determination of histograms based on the target response. Consequently, characteristics of the target determined based on such histograms may be more accurate than conventional systems and techniques that may generate histograms based on less accurate instrument response histograms.

Figure 1:
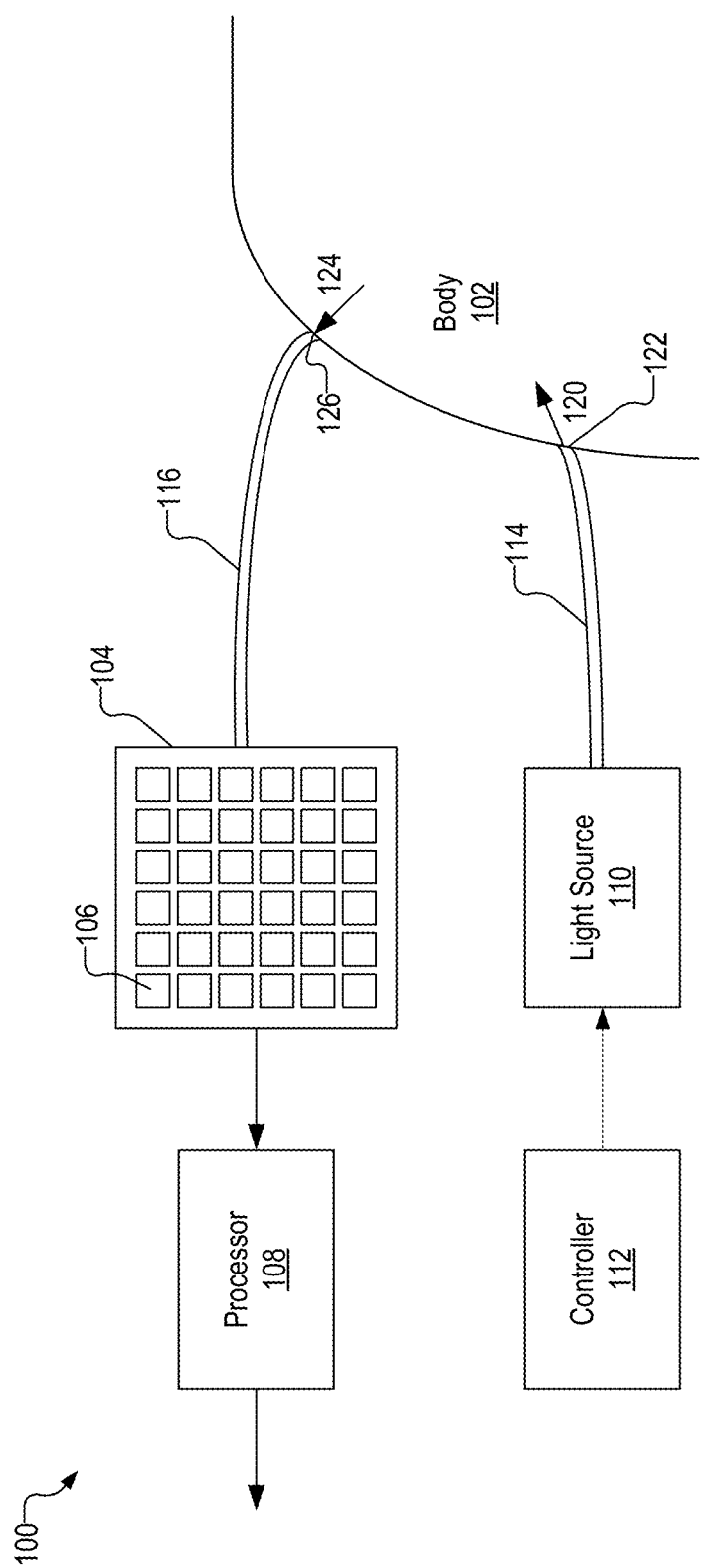
FIG. 1 shows an illustrative optical measurement system.

FIG. 1 shows an exemplary optical measurement system 100 configured to perform an optical measurement operation with respect to a body 102. Optical measurement system 100 may, in some examples, be portable and/or wearable by a user. Optical measurement systems that may be used in connection with the embodiments described herein are described more fully in U.S. patent application Ser. No. 17/176,315, filed Feb. 16, 2021 and published as US2021/0259638A1; U.S. patent application Ser. No. 17/176,309, filed Feb. 16, 2021 and published as US2021/0259614A1; U.S. patent application Ser. No. 17/176,460, filed Feb. 16, 2021 and issued as U.S. Pat. No. 11,096,620; U.S. patent application Ser. No. 17/176,470, filed Feb. 16, 2021 and issued as U.S. Pat. No. 11,771,362; U.S. patent application Ser. No. 17/176,487, filed Feb. 16, 2021 and published as US2021/0259632A1; U.S. patent application Ser. No. 17/176,539, filed Feb. 16, 2021 and published as US2021/0259620A1; U.S. patent application Ser. No. 17/176,560, filed Feb. 16, 2021 and published as US2021/0259597A1; U.S. patent application Ser. No. 17/176,466, filed Feb. 16, 2021 and issued as U.S. Pat. No. 11,630,310; Han Y. Ban, et al., "Kernel Flow: A High Channel Count Scalable TD-fNIRS System," SPIE Photonics West Conference (Mar. 6, 2021); and Han Y. Ban, et al., "Kernel Flow: a high channel count scalable time-domain functional near-infrared spectroscopy system," Journal of Biomedical Optics (Jan. 18, 2022), which applications and publications are incorporated herein by reference in their entirety.

In some examples, optical measurement operations performed by optical measurement system 100 are associated with a time domain-based optical measurement technique. Example time domain-based optical measurement techniques include, but are not limited to, time-correlated single-photon counting (TCSPC), time domain near infrared spectroscopy (TD-NIRS), time domain diffusive correlation spectroscopy (TD-DCS), and time domain Digital Optical Tomography (TD-DOT).

Optical measurement system 100 (e.g., an optical measurement system that is implemented by a wearable device or other configuration, and that employs a time domain-based (e.g., TD-NIRS) measurement technique) may detect blood oxygenation levels and/or blood volume levels by measuring the change in shape of laser pulses after they have passed through target tissue, e.g., brain, muscle, finger, etc. As used herein, a shape of laser pulses refers to a temporal shape, as represented for example by a histogram generated by a time-to-digital converter (TDC) coupled to an output of a photodetector, as will be described more fully below.

As shown, optical measurement system 100 includes a detector 104 that includes a plurality of individual photodetectors (e.g., photodetector 106), a processor 108 coupled to detector 104, a light source 110, a controller 112, and optical conduits 114 and 116 (e.g., light pipes). However, one or more of these components may not, in certain embodiments, be considered to be a part of optical measurement system 100. For example, in implementations where optical measurement system 100 is wearable by a user, processor 108 and/or controller 112 may in some embodiments be separate from optical measurement system 100 and not configured to be worn by the user.

Detector 104 may include any number of photodetectors 106 as may serve a particular implementation, such as $2^n$ photodetectors (e.g., 256, 512, . . . , 16384, etc.), where n is an integer greater than or equal to one (e.g., 4, 5, 8, 10, 11, 14, etc.). Photodetectors 106 may be arranged in any suitable manner.

Photodetectors 106 may each be implemented by any suitable circuit configured to detect individual photons of light incident upon photodetectors 106. For example, each photodetector 106 may be implemented by a single photon avalanche diode (SPAD) circuit and/or other circuitry as may serve a particular implementation.

Processor 108 may be implemented by one or more physical processing (e.g., computing) devices. In some examples, processor 108 may execute instructions (e.g., software) configured to perform one or more of the operations described herein.

Light source 110 may be implemented by any suitable component configured to generate and emit light. For example, light source 110 may be implemented by one or more laser diodes, distributed feedback (DFB) lasers, super luminescent diodes (SLDs), light emitting diodes (LEDs), diode-pumped solid-state (DPSS) lasers, super luminescent light emitting diodes (sLEDs), vertical-cavity surface-emitting lasers (VCSELs), titanium sapphire lasers, micro light emitting diode (mLEDs), and/or any other suitable laser or light source configured to emit light in one or more discrete wavelengths or narrow wavelength bands. In some examples, the light emitted by light source 110 is high coherence light (e.g., light that has a coherence length of at least 5 centimeters) at a predetermined center wavelength. In some examples, the light emitted by light source 110 is emitted as a plurality of alternating light pulses of different wavelengths.

Light source 110 is controlled by controller 112, which may be implemented by any suitable computing device (e.g., processor 108), integrated circuit, and/or combination of hardware and/or software as may serve a particular implementation. In some examples, controller 112 is configured to control light source 110 by turning light source 110 on and off and/or setting an intensity of light generated by light source 110. Controller 112 may be manually operated by a user, or may be programmed to control light source 110 automatically.

Light emitted by light source 110 travels via an optical conduit 114 (e.g., a light pipe, a single-mode optical fiber, and/or or a multi-mode optical fiber) to body 102 of a subject. Body 102 may include any suitable turbid medium. For example, in some implementations, body 102 is a head or any other body part of a human or other animal. Alternatively, body 102 may be a non-living object. For illustrative purposes, it will be assumed in the examples provided herein that body 102 is a human head.

As indicated by an arrow 120, light emitted by light source 110 enters body 102 at a first location 122 on body 102. Accordingly, a distal end of optical conduit 114 may be positioned at (e.g., right above, in physical contact with, or physically attached to) first location 122 (e.g., to a scalp of the subject). In some examples, the light may emerge from optical conduit 114 and spread out to a certain spot size on body 102 to fall under a predetermined safety limit. At least a portion of the light indicated by arrow 120 may be scattered within body 102.

As used herein, "distal" means nearer, along the optical path of the light emitted by light source 110 or the light received by detector 104, to the target (e.g., within body 102) than to light source 110 or detector 104. Thus, the distal end of optical conduit 114 is nearer to body 102 than to light source 110, and the distal end of optical conduit 116 is nearer to body 102 than to detector 104. Additionally, as used herein, "proximal" means nearer, along the optical path of the light emitted by light source 110 or the light received by detector 104, to light source 110 or detector 104 than to body 102. Thus, the proximal end of optical conduit 114 is nearer to light source 110 than to body 102, and the proximal end of optical conduit 116 is nearer to detector 104 than to body 102.

As shown, the distal end of optical conduit 116 (e.g., a light pipe, a light guide, a waveguide, a single-mode optical fiber, and/or a multi-mode optical fiber) is positioned at (e.g., right above, in physical contact with, or physically attached to) output location 126 on body 102. In this manner, optical conduit 116 may collect at least a portion of the scattered light (indicated as light 124) as it exits body 102 at location 126 and carry light 124 to detector 104. Light 124 may pass through one or more lenses and/or other optical elements (not shown) that direct light 124 onto each of the photodetectors 106 included in detector 104.

Photodetectors 106 may be connected in parallel in detector 104. An output of each of photodetectors 106 may be accumulated to generate an accumulated output of detector 104. Processor 108 may receive the accumulated output and determine, based on the accumulated output, a temporal distribution of photons detected by photodetectors 106. Processor 108 may then generate, based on the temporal distribution, a histogram representing a light pulse response of a target (e.g., brain tissue, blood flow, etc.) in body 102. Example embodiments of accumulated outputs are described herein.

Figure 2:
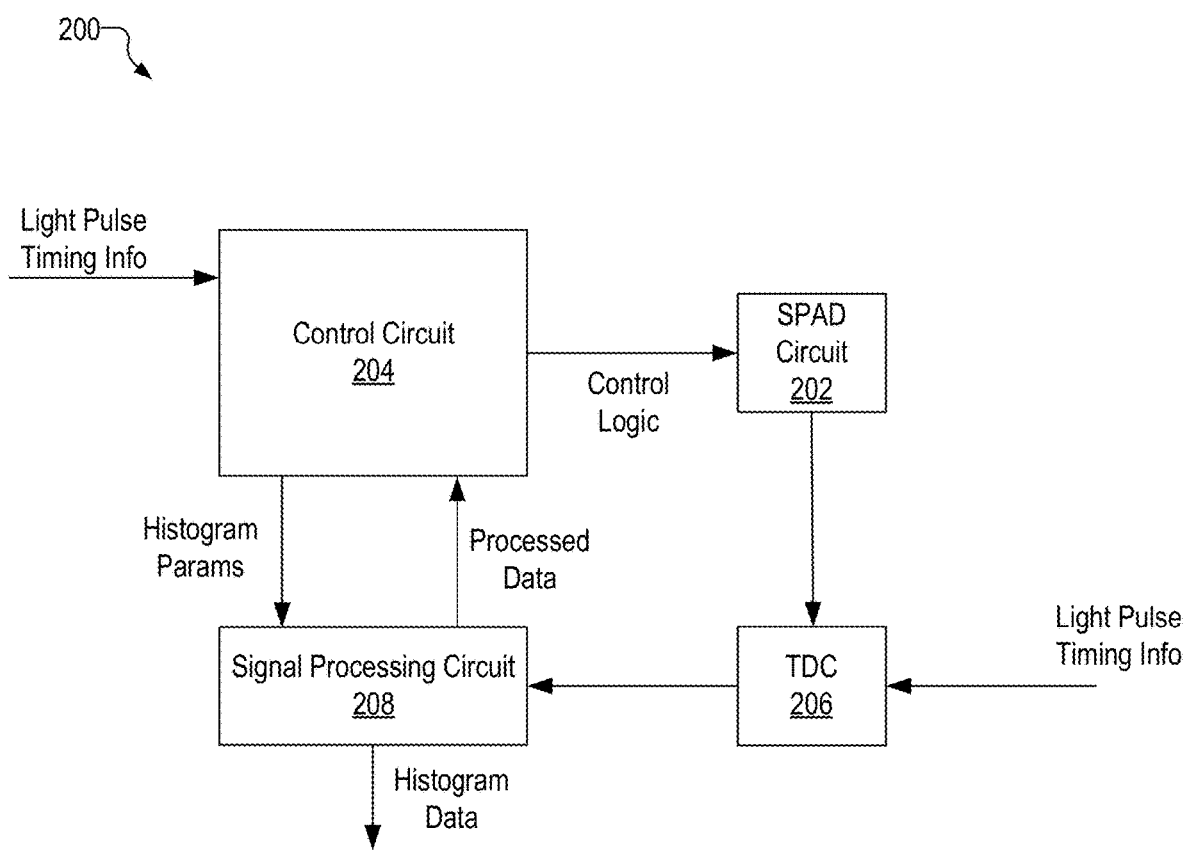
FIG. 2 shows an illustrative detector architecture.

FIG. 2 illustrates an exemplary detector architecture 200 that may be used in accordance with the systems and methods described herein. As shown, architecture 200 includes a SPAD circuit 202 that implements photodetector 106, a control circuit 204, a time-to-digital converter (TDC) 206, and a signal processing circuit 208. Architecture 200 may include additional or alternative components as may serve a particular implementation.

In some examples, SPAD circuit 202 may include a SPAD and a fast gating circuit configured to operate together to detect a photon incident upon the SPAD. As described herein, SPAD circuit 202 may generate an output when SPAD circuit 202 detects a photon.

The fast gating circuit included in SPAD circuit 202 may be implemented in any suitable manner. For example, the fast gating circuit may include a capacitor that is pre-charged with a bias voltage before a command is provided to arm the SPAD. Gating the SPAD with a capacitor instead of with an active voltage source, such as is done in some conventional SPAD architectures, has a number of advantages and benefits. For example, a SPAD that is gated with a capacitor may be armed practically instantaneously compared to a SPAD that is gated with an active voltage source. This is because the capacitor is already charged with the bias voltage when a command is provided to arm the SPAD. This is described more fully in U.S. Pat. Nos. 10,158,038 and 10,424,683, which are incorporated herein by reference in their entireties.

In some alternative configurations, such as in configurations that implement the systems and methods described herein, SPAD circuit 202 does not include a fast gating circuit. In these configurations, the SPAD included in SPAD circuit 202 may be gated in any suitable manner or be configured to operate in a free running mode with passive quenching.

Control circuit 204 may be implemented by an application specific integrated circuit (ASIC) or any other suitable circuit configured to control an operation of various components within SPAD circuit 202. For example, control circuit 204 may output control logic that puts the SPAD included in SPAD circuit 202 in either an armed or a disarmed state.

In some examples, control circuit 204 may control a gate delay, which specifies a predetermined amount of time control circuit 204 is to wait after an occurrence of a light pulse (e.g., a laser pulse) to put the SPAD in the armed state. To this end, control circuit 204 may receive light pulse timing information, which indicates a time at which a light pulse occurs (e.g., a time at which the light pulse is applied to body 102). Control circuit 204 may also control a programmable gate width, which specifies how long the SPAD is kept in the armed state before being disarmed.

Control circuit 204 is further configured to control signal processing circuit 208. For example, control circuit 204 may provide histogram parameters (e.g., time bins, number of light pulses, type of histogram, etc.) to signal processing circuit 208. Signal processing circuit 208 may generate histogram data in accordance with the histogram parameters. In some examples, control circuit 204 is at least partially implemented by controller 112.

TDC 206 is configured to measure a time difference between an occurrence of an output pulse generated by SPAD circuit 202 and an occurrence of a light pulse. To this end, TDC 206 may also receive the same light pulse timing information that control circuit 204 receives. TDC 206 may be implemented by any suitable circuitry as may serve a particular implementation.

Signal processing circuit 208 is configured to perform one or more signal processing operations on data output by TDC 206. For example, signal processing circuit 208 may generate histogram data based on the data output by TDC 206 and in accordance with histogram parameters provided by control circuit 204. To illustrate, signal processing circuit 208 may generate, store, transmit, compress, analyze, decode, and/or otherwise process histograms based on the data output by TDC 206. In some examples, signal processing circuit 208 may provide processed data to control circuit 204, which may use the processed data in any suitable manner. In some examples, signal processing circuit 208 is at least partially implemented by processor 108.

In some examples, each photodetector 106 (e.g., SPAD circuit 202) may have a dedicated TDC 206 associated therewith. For example, for an array of N photodetectors 106, there may be a corresponding array of N TDCs 206. Alternatively, a single TDC 206 may be associated with multiple photodetectors 106. Likewise, a single control circuit 204 and a single signal processing circuit 208 may be provided for a one or more photodetectors 106 and/or TDCs 206.

Figure 3:
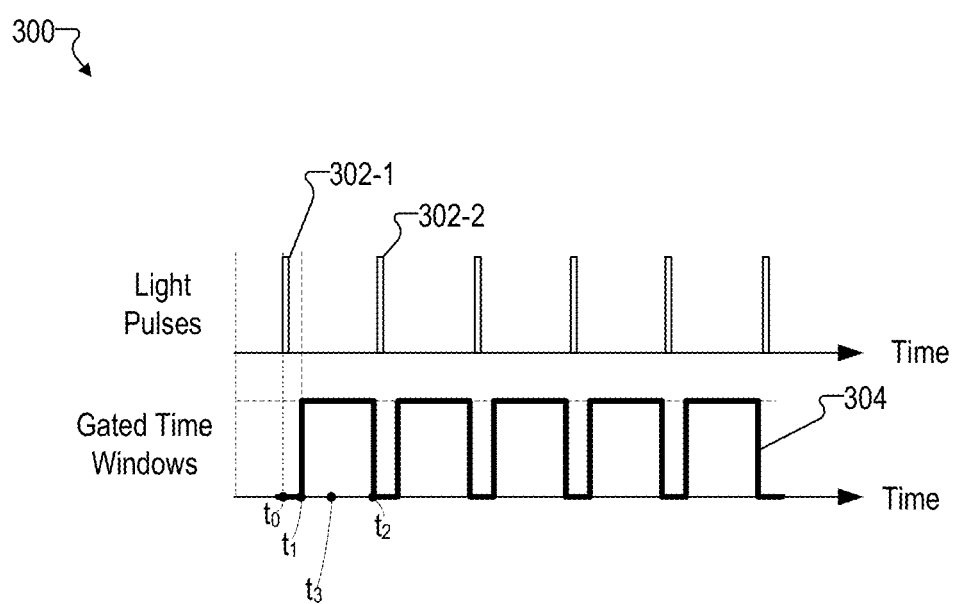
FIG. 3 shows an illustrative timing diagram for performing an optical measurement operation using an optical measurement system.

FIG. 3 illustrates an exemplary timing diagram 300 for performing an optical measurement operation using optical measurement system 100. The optical measurement operation may be performed in accordance with a time domain-based technique, such as TD-NIRS. Optical measurement system 100 may be configured to perform the optical measurement operation by directing light pulses (e.g., laser pulses) toward a target within a body (e.g., body 102). The light pulses may be short (e.g., 10-2000 picoseconds (ps)) and repeated at a high frequency (e.g., between 100,000 hertz (Hz) and 100 megahertz (MHz)). The light pulses may be scattered by the target and at least a portion of the scattered light may be detected by optical measurement system 100. Optical measurement system 100 may measure a time relative to the light pulse for each detected photon. By counting the number of photons detected at each time relative to each light pulse repeated over a plurality of light pulses, optical measurement system 100 may generate a histogram that represents a light pulse response of the target (e.g., a temporal point spread function (TPSF)). The terms histogram and TPSF are used interchangeably herein to refer to a light pulse response of a target.

Timing diagram 300 shows a sequence of light pulses 302 (e.g., light pulses 302-1 and 302-2) that may be applied to the target (e.g., tissue within a finger of a user, tissue within a brain of a user, blood flow, a fluorescent material used as a probe in a body of a user, etc.). Timing diagram 300 also shows a pulse wave 304 representing predetermined gated time windows (also referred as gated time periods) during which photodetectors 106 are gated ON to detect photons. As shown, light pulse 302-1 is applied at a time $t_0$. At a time $t_1$, a first instance of the predetermined gated time window begins. Photodetectors 106 may be armed at time $t_1$, enabling photodetectors 106 to detect photons scattered by the target during the predetermined gated time window. In this example, time $t_1$ is set to be at a certain time after time $t_0$, which may minimize photons detected directly from the laser pulse, before the laser pulse reaches the target. However, in some alternative examples, time $t_1$ is set to be equal to time $t_0$.

At a time $t_2$, the predetermined gated time window ends. In some examples, photodetectors 106 may be disarmed at time $t_2$. In other examples, photodetectors 106 may be reset (e.g., disarmed and re-armed) at time $t_2$ or at a time subsequent to time $t_2$. During the predetermined gated time window, photodetectors 106 may detect photons scattered by the target. Photodetectors 106 may be configured to remain armed during the predetermined gated time window such that photodetectors 106 maintain an output upon detecting a photon during the predetermined gated time window. For example, a photodetector 106 may detect a photon at a time $t_3$, which is during the predetermined gated time window between times $t_1$ and $t_2$. The photodetector 106 may be configured to provide an output indicating that the photodetector 106 has detected a photon. The photodetector 106 may be configured to continue providing the output until time $t_2$, when the photodetector may be disarmed and/or reset. Optical measurement system 100 may generate an accumulated output from the plurality of photodetectors. Optical measurement system 100 may sample the accumulated output to determine times at which photons are detected by photodetectors 106 to generate a TPSF.

As mentioned, in some alternative examples, photodetector 106 may be configured to operate in a free-running mode such that photodetector 106 is not actively armed and disarmed (e.g., at the end of each predetermined gated time window represented by pulse wave 304). In contrast, while operating in the free-running mode, photodetector 106 may be configured to reset within a configurable time period after an occurrence of a photon detection event (i.e., after photodetector 106 detects a photon) and immediately begin detecting new photons. However, only photons detected within a desired time window (e.g., during each gated time window represented by pulse wave 304) may be included in the TPSF.

Figure 4:
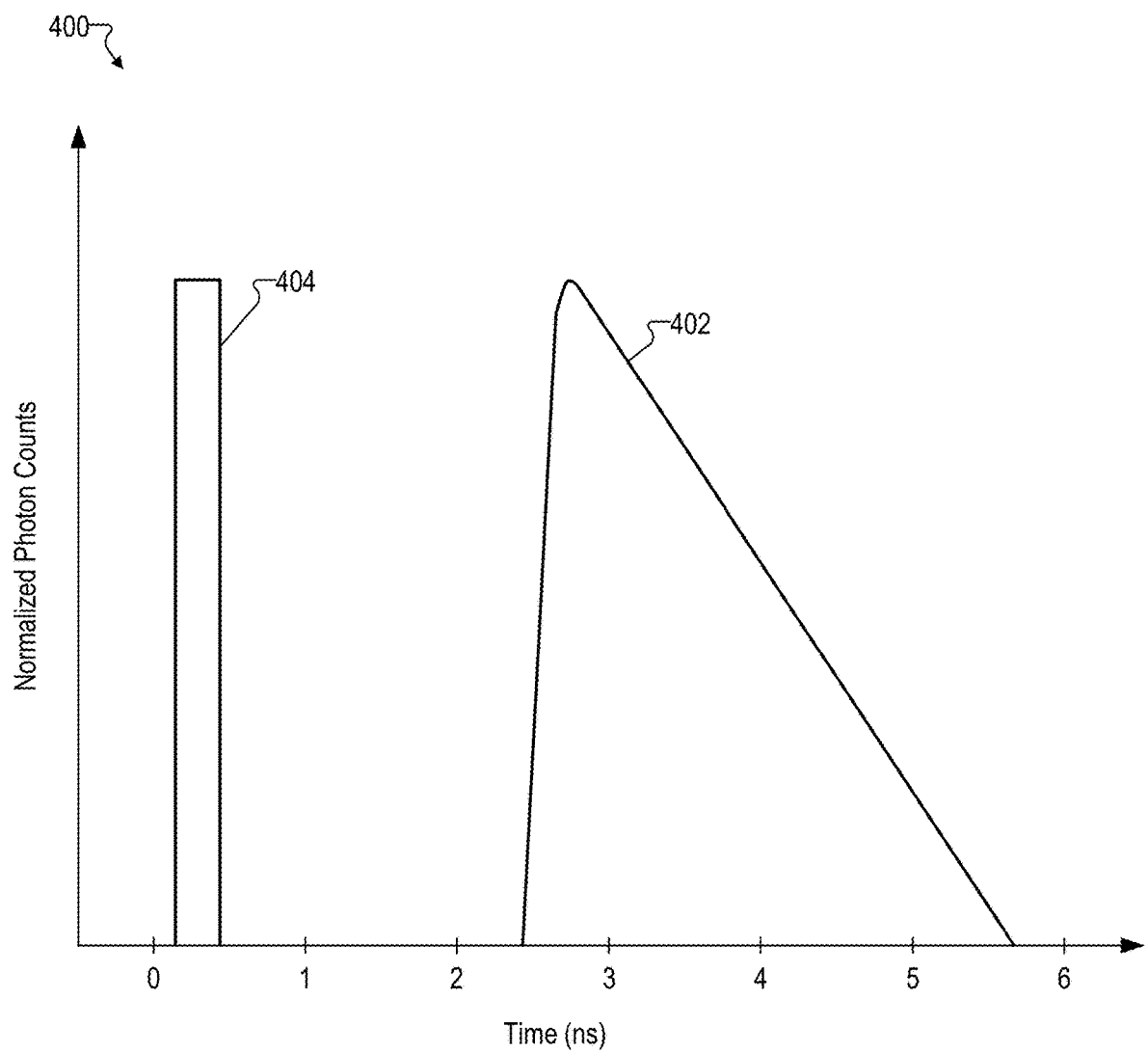
FIG. 4 shows a graph of an illustrative temporal point spread function that may be generated by an optical measurement system in response to a light pulse.

FIG. 4 illustrates a graph 400 of an exemplary TPSF 402 that may be generated by optical measurement system 100 in response to a light pulse 404 (which, in practice, represents a plurality of light pulses). Graph 400 shows a normalized count of photons on a y-axis and time bins on an x-axis. As shown, TPSF 402 is delayed with respect to a temporal occurrence of light pulse 404. In some examples, the number of photons detected in each time bin subsequent to each occurrence of light pulse 404 may be aggregated (e.g., integrated) to generate TPSF 402. TPSF 402 may be analyzed and/or processed in any suitable manner to determine or infer biological activity, e.g., brain measurement activity from a user.

Optical measurement system 100 may be implemented by or included in any suitable device. For example, optical measurement system 100 may be included in a non-invasive wearable device (e.g., a headpiece) that a user may wear to perform one or more diagnostic, imaging, analytical, and/or consumer-related operations.

Figure 5:
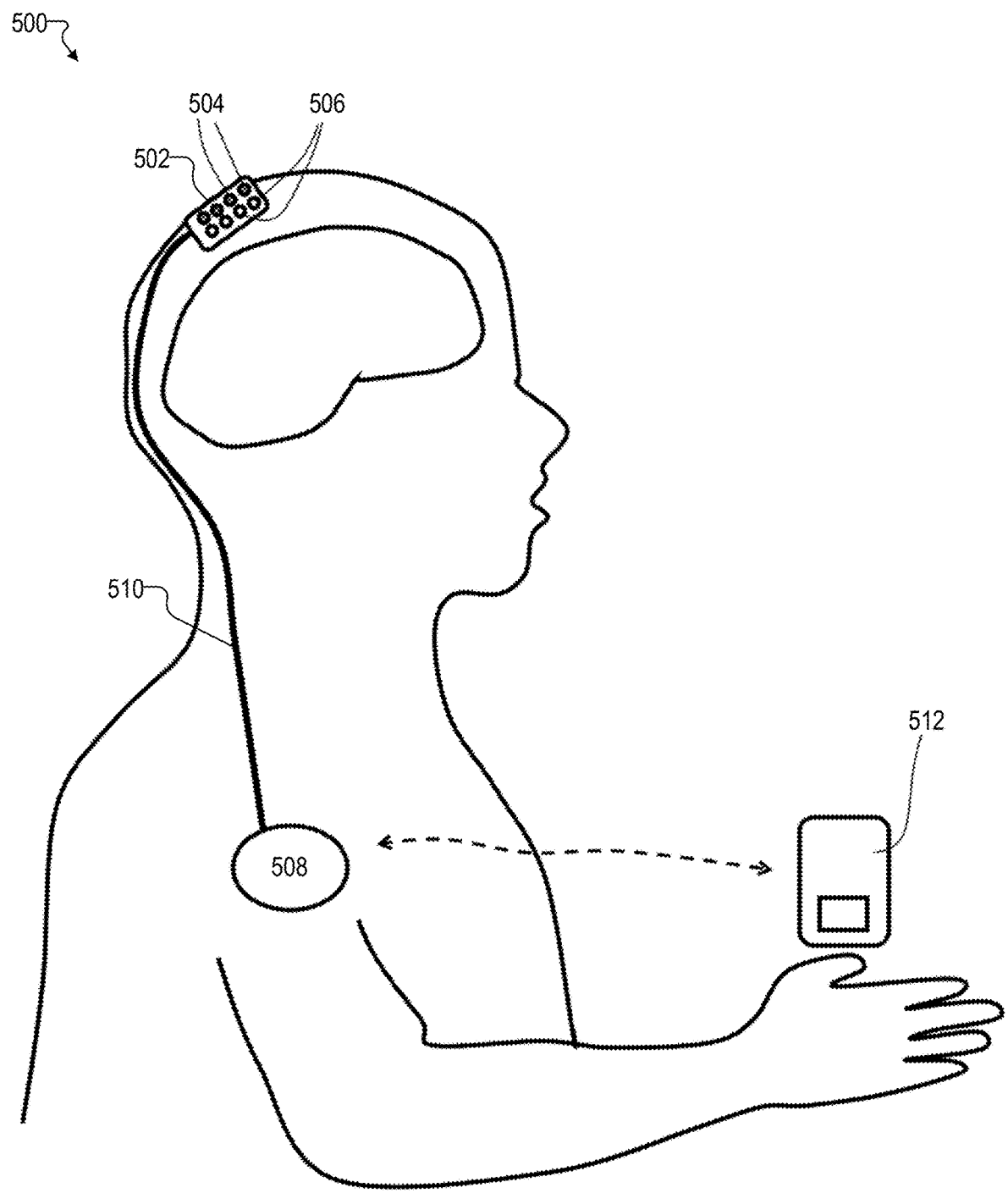
FIG. 5 shows an illustrative non-invasive wearable brain interface system.

To illustrate, FIG. 5 shows an exemplary non-invasive wearable brain interface system 500 ("brain interface system 500") that implements optical measurement system 100 (shown in FIG. 1). As shown, brain interface system 500 includes a head-mountable component 502 configured to be a wearable device (e.g., headgear) configured to be worn on a user's head. Head-mountable component 502 may be implemented by a cap shape that is worn on a head of a user. Alternative implementations of head-mountable component 502 include helmets, beanies, headbands, other hat shapes, or other forms conformable to be worn on a user's head, etc. For example, other forms conformable to be worn on the user's head include modular assemblies as will described more fully herein. Head-mountable component 502 may be made out of any suitable cloth, soft polymer, plastic, hard shell, and/or any other suitable material as may serve a particular implementation. Examples of headgears used with wearable brain interface systems are described more fully in U.S. Pat. No. 10,340,408, incorporated herein by reference in its entirety.

Head-mountable component 502 includes a plurality of detectors 504, which may implement or be similar to detector 104, and a plurality of light sources 506, which may be implemented by or be similar to light source 110. It will be recognized that in some alternative embodiments, head-mountable component 502 may include a single detector 504 and/or a single light source 506.

Brain interface system 500 may be used for controlling an optical path to the brain and for transforming photodetector measurements into an intensity value that represents an optical property of a target within the brain. Brain interface system 500 allows optical detection of deep anatomical locations beyond skin and bone (e.g., skull) by extracting data from photons originating from light source 506 and emitted to a target location within the user's brain, in contrast to conventional imaging systems and methods (e.g., optical coherence tomography (OCT)), which only image superficial tissue structures or through optically transparent structures.

Brain interface system 500 may further include a processor 508 configured to communicate with (e.g., control and/or receive signals from) detectors 504 and light sources 506 by way of a communication link 510. Communication link 510 may include any suitable wired and/or wireless communication link. Processor 508 may include any suitable housing and may be located on the user's scalp, neck, shoulders, chest, or arm, as may be desirable. In some variations, processor 508 may be integrated in the same assembly housing as detectors 504 and light sources 506.

As shown, brain interface system 500 may optionally include a remote processor 512 in communication with processor 508. For example, remote processor 512 may store measured data from detectors 504 and/or processor 508 from previous detection sessions and/or from multiple brain interface systems (not shown). Power for detectors 504, light sources 506, and/or processor 508 may be provided via a wearable battery (not shown). In some examples, processor 508 and the battery may be enclosed in a single housing, and wires carrying power signals from processor 508 and the battery may extend to detectors 504 and light sources 506. Alternatively, power may be provided wirelessly (e.g., by induction).

In some alternative embodiments, head mountable component 502 does not include individual light sources. Instead, a light source configured to generate the light that is detected by detectors 504 may be included elsewhere in brain interface system 500. For example, a light source may be included in processor 508 and coupled to head mountable component 502 through optical connections.

Optical measurement system 100 may alternatively be included in a non-wearable device (e.g., a medical device and/or consumer device that is placed near the head or other body part of a user to perform one or more diagnostic, imaging, and/or consumer-related operations). Optical measurement system 100 may alternatively be included in a sub-assembly enclosure of a wearable invasive device (e.g., an implantable medical device for brain recording and imaging).

Figure 6A:
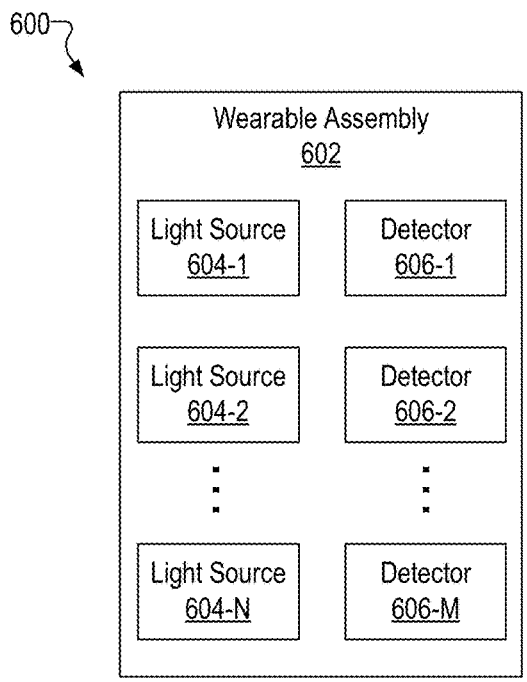
FIG. 6A-6B show an illustrative optical measurement system.
Figure 6B:
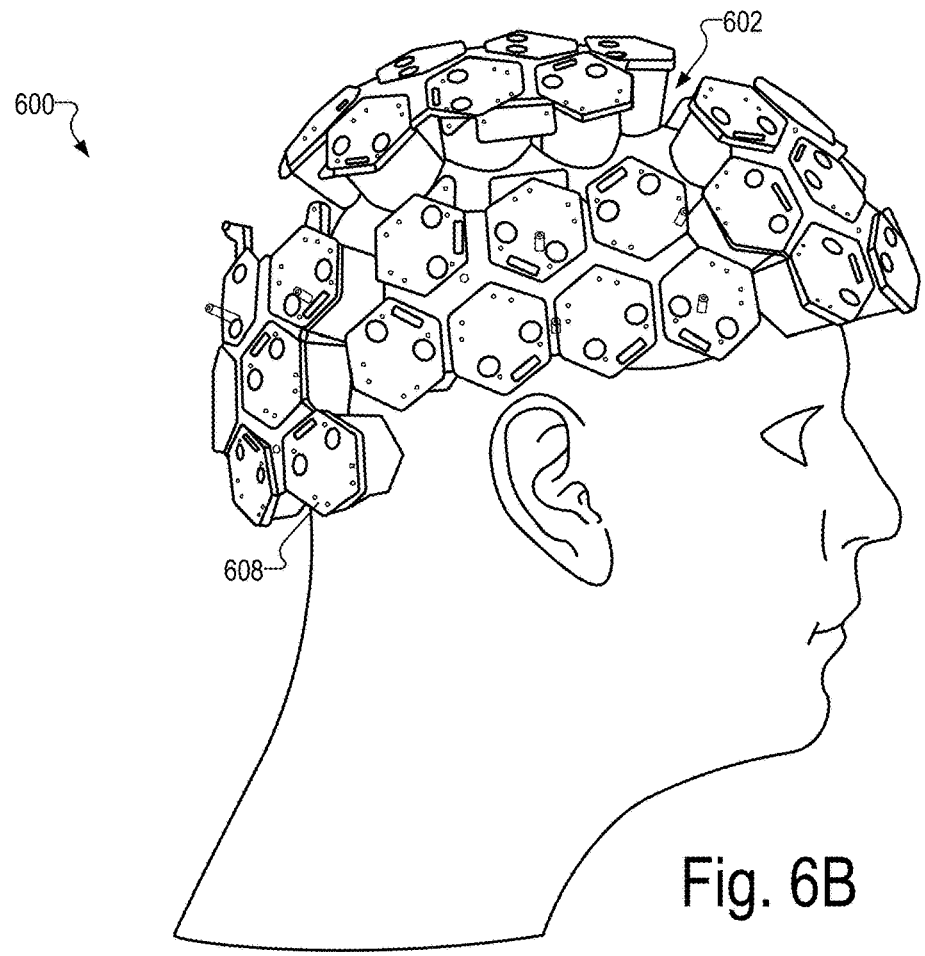

FIGS. 6A-6B shows an exemplary optical measurement system 600 in accordance with the principles described herein. Optical measurement system 600 may be an implementation of optical measurement system 100 and, as shown in FIG. 6A, includes a wearable assembly 602, which includes N light sources 604 (e.g., light sources 604-1 through 604-N) and M detectors 606 (e.g., detectors 606-1 through 606-M). Optical measurement system 600 may include any of the other components of optical measurement system 100 as may serve a particular implementation. N and M may each be any suitable value (i.e., there may be any number of light sources 604 and detectors 606 included in optical measurement system 600 as may serve a particular implementation).

Light sources 604 are each configured to emit light (e.g., a sequence of light pulses) and may be implemented by any of the light sources described herein. Detectors 606 may each be configured to detect arrival times for photons of the light emitted by one or more light sources 604 after the light is scattered by the target. For example, a detector 606 may include a photodetector configured to generate a photodetector output pulse in response to detecting a photon of the light and a TDC configured to record a timestamp symbol in response to an occurrence of the photodetector output pulse, the timestamp symbol representative of an arrival time for the photon (i.e., when the photon is detected by the photodetector).

Wearable assembly 602 may be implemented by any of the wearable devices, modular assemblies, and/or wearable units described herein. For example, as shown in FIG. 6B, wearable assembly 602 may be implemented by a wearable device (e.g., headgear) configured to be worn on a user's head. The TD-NIRS optical measurement system 600 shown in FIG. 6B may include a plurality of modules 608 arranged in a helmet design. Modules 608 may be organized on each side of the head, covering the frontal, parietal, temporal, and occipital cortices. Wearable assembly 602 may additionally or alternatively be configured to be worn on any other part of a user's body.

Optical measurement system 600 may be modular in that one or more components of optical measurement system 600 may be removed, changed out, or otherwise modified as may serve a particular implementation. As such, optical measurement system 600 may be configured to conform to three-dimensional surface geometries, such as a user's head, e.g., see FIG. 6B. Exemplary modular optical measurement systems comprising a plurality of wearable modules are described in more detail in U.S. patent application Ser. No. 17/176,460, filed Feb. 16, 2021 and issued as U.S. Pat. No. 11,096,620, U.S. patent application Ser. No. 17/176,470, filed Feb. 16, 2021 and issued as U.S. Pat. No. 11,771,362, U.S. patent application Ser. No. 17/176,487, filed Feb. 16, 2021 and published as US2021/0259632A1, U.S. patent application Ser. No. 17/176,539, filed Feb. 16, 2021 and published as US2021/0259620A1, U.S. patent application Ser. No. 17/176,560, filed Feb. 16, 2021 and published as US2021/0259597A1, and U.S. patent application Ser. No. 17/176,466, filed Feb. 16, 2021 and issued as U.S. Pat. No. 11,630,310, which applications are incorporated herein by reference in their respective entireties.

Figure 7:
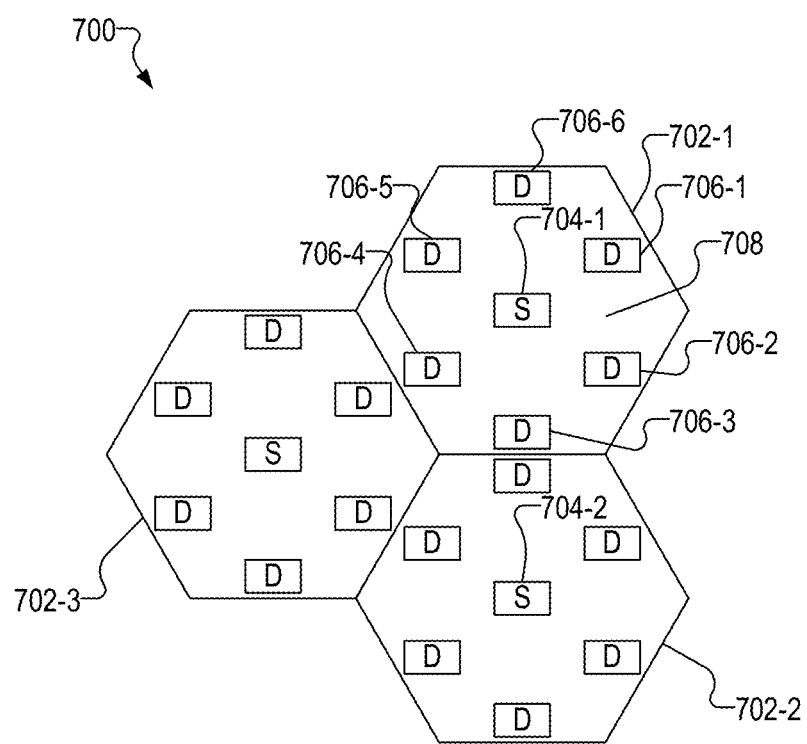
FIG. 7 shows an illustrative modular assembly.

FIG. 7 shows an illustrative modular assembly 700 that may implement optical measurement system 600. Modular assembly 700 is illustrative of the many different implementations of optical measurement system 600 that may be realized in accordance with the principles described herein.

As shown, modular assembly 700 includes a plurality of modules 702 (e.g., modules 702-1 through 702-3). While three modules 702 are shown to be included in modular assembly 700, in alternative configurations, any number of modules 702 (e.g., a single module unit up to sixteen or more module units) may be included in modular assembly 700.

Each module unit 702 includes a light source (e.g., light source 704-1 of module 702-1 and light source 704-2 of module 702-2) and a plurality of detectors (e.g., detectors 706-1 through 706-6 of module 702-1). In the particular implementation shown in FIG. 7, each module unit 702 includes a single light source and six detectors. Each light source is labeled "S" and each detector is labeled "D".

Each light source depicted in FIG. 7 may be implemented by one or more light sources similar to light source 110 and may be configured to emit light directed at a target (e.g., the brain).

Each light source depicted in FIG. 7 may be located at a center region of a surface of the light source's corresponding module. For example, light source 704-1 is located at a center region of a surface 708 of module 702-1. In alternative implementations, a light source of a module may be located away from a center region of the module.

Each detector depicted in FIG. 7 may implement or be similar to detector 104 and may include a plurality of photodetectors (e.g., SPADs) as well as other circuitry (e.g., TDCs), and may be configured to detect arrival times for photons of the light emitted by one or more light sources after the light is scattered by the target.

The detectors of a module may be distributed around the light source of the module. For example, detectors 706 of module 702-1 are distributed around light source 704-1 on surface 708 of module 702-1. In this configuration, detectors 706 may be configured to detect photon arrival times for photons included in light pulses emitted by light source 704-1. In some examples, one or more detectors 706 may be close enough to other light sources to detect photon arrival times for photons included in light pulses emitted by the other light sources. For example, because detector 706-3 is adjacent to module 702-2, detector 706-3 may be configured to detect photon arrival times for photons included in light pulses emitted by light source 704-2 (in addition to detecting photon arrival times for photons included in light pulses emitted by light source 704-1).

In some examples, the detectors of a module may all be equidistant from the light source of the same module. In other words, the spacing between a light source (i.e., a distal end portion of a light source optical conduit) and the detectors (i.e., distal end portions of optical conduits for each detector) are maintained at the same fixed distance on each module to ensure homogeneous coverage over specific areas and to facilitate processing of the detected signals. The fixed spacing also provides consistent spatial (lateral and depth) resolution across the target area of interest, e.g., brain tissue. Moreover, maintaining a known distance between the light source, e.g., light emitter, and the detector allows subsequent processing of the detected signals to infer spatial (e.g., depth localization, inverse modeling) information about the detected signals. Detectors of a module may be alternatively disposed on the module as may serve a particular implementation.

Figure 8A:
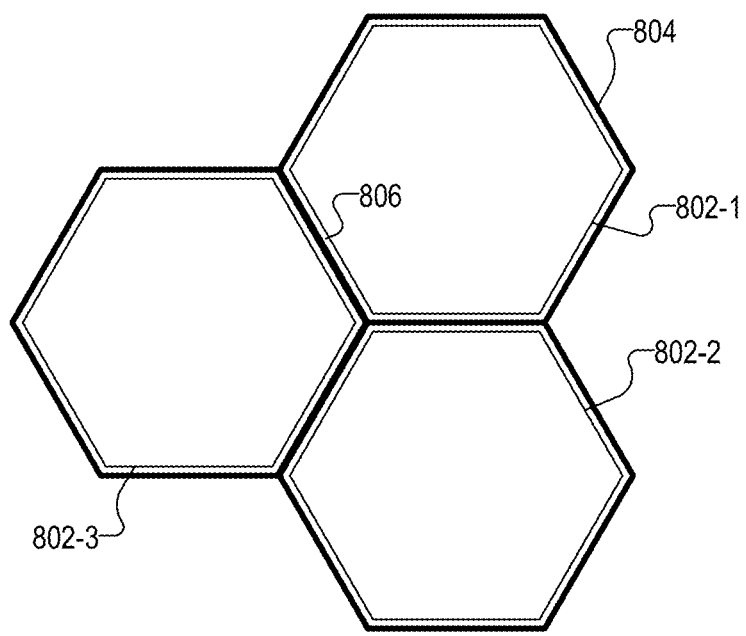
FIGS. 8A-8B show an illustrative implementation of the modular assembly of FIG. 7.
Figure 8B:
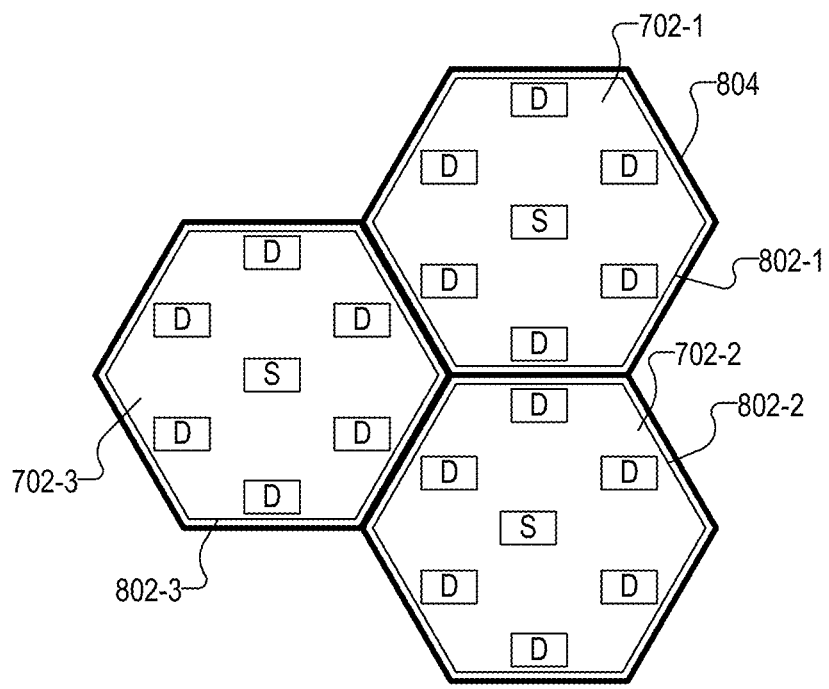

In FIG. 7, modules 702 are shown to be adjacent to and touching one another. Modules 702 may alternatively be spaced apart from one another. For example, FIGS. 8A-8B show an exemplary implementation of modular assembly 700 in which modules 702 are configured to be inserted into individual slots 802 (e.g., slots 802-1 through 802-3, also referred to as cutouts) of a wearable assembly 804. In particular, FIG. 8A shows the individual slots 802 of the wearable assembly 804 before modules 702 have been inserted into respective slots 802, and FIG. 8B shows wearable assembly 804 with individual modules 702 inserted into respective individual slots 802.

Wearable assembly 804 may implement wearable assembly 602 and may be configured as headgear and/or any other type of device configured to be worn by a user.

As shown in FIG. 8A, each slot 802 is surrounded by a wall (e.g., wall 806) such that when modules 702 are inserted into their respective individual slots 802, the walls physically separate modules 702 one from another. In alternative embodiments, a module (e.g., module 702-1) may be in at least partial physical contact with a neighboring module (e.g., module 702-2).

Each of the modules described herein may be inserted into appropriately shaped slots or cutouts of a wearable assembly, as described in connection with FIGS. 8A-8B.

As shown in FIGS. 7 and 8B, modules 702 may have a hexagonal shape. Modules 702 may alternatively have any other suitable geometry (e.g., in the shape of a pentagon, octagon, square, rectangular, circular, triangular, free-form, etc.).

In some examples, any of the optical measurement systems described herein may be implemented by a wearable multimodal measurement system configured to perform both optical-based brain data acquisition operations and electrical-based brain data acquisition operations, such as any of the wearable multimodal measurement systems described in U.S. Patent Application Publication Nos. 2021/0259638 and 2021/0259614, which publications are incorporated herein by reference in their respective entireties.

Figure 9:
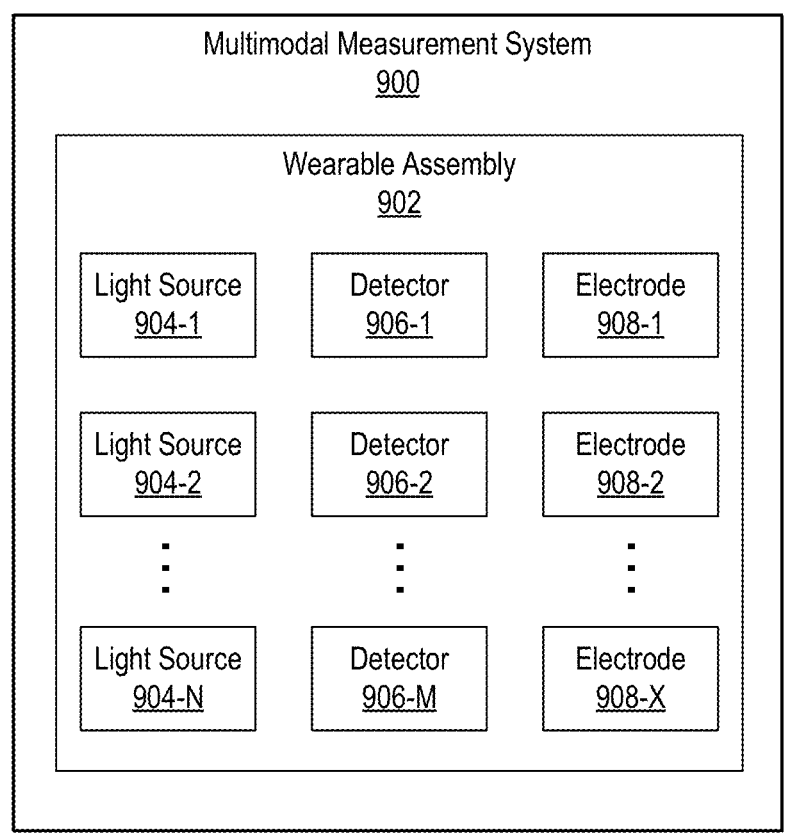
FIG. 9 shows an illustrative multimodal measurement system.
Figure 10:
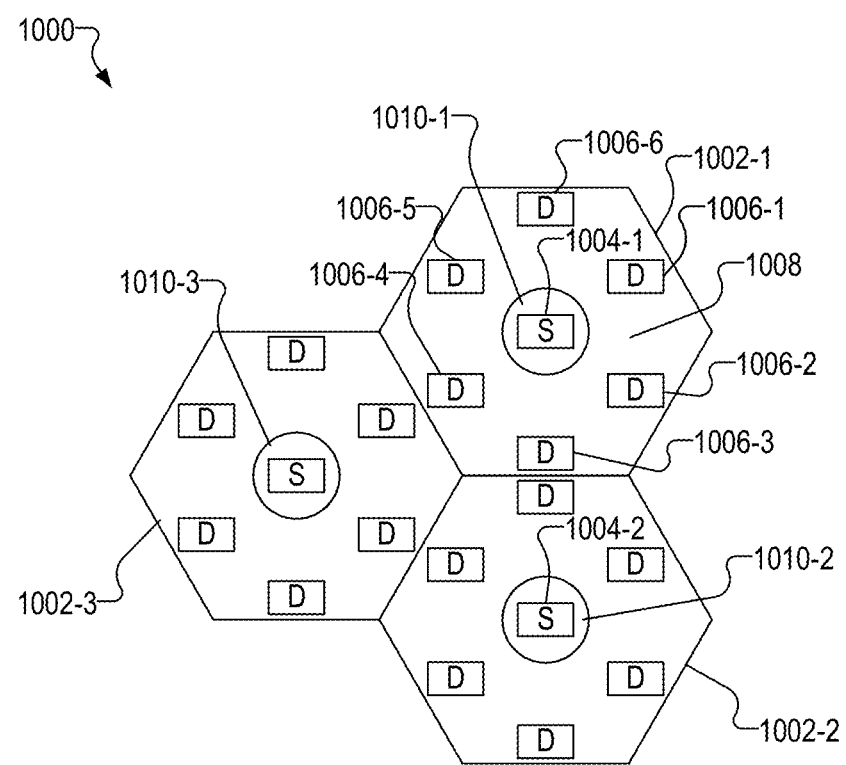
FIG. 10 shows an illustrative modular assembly.

To illustrate, FIGS. 9-10 show various multimodal measurement systems that may implement optical measurement system 100. The multimodal measurement systems described herein are merely illustrative of the many different multimodal-based brain interface systems that may be used in accordance with the systems and methods described herein.

FIG. 9 shows an exemplary multimodal measurement system 900 in accordance with the principles described herein. Multimodal measurement system 900 may at least partially implement optical measurement system 100 and, as shown, includes a wearable assembly 902 (which may be similar to wearable assembly 602), which includes N light sources 904 (e.g., light sources 904-1 through 904-N, which are similar to light sources 604), M detectors 906 (e.g., detectors 906-1 through 906-M, which are similar to detectors 606), and X electrodes (e.g., electrodes 908-1 through 908-X). Multimodal measurement system 900 may include any of the other components of optical measurement system 100 as may serve a particular implementation. N, M, and X may each be any suitable value (i.e., there may be any number of light sources 904, any number of detectors 906, and any number of electrodes 908 included in multimodal measurement system 900 as may serve a particular implementation).

Electrodes 908 may be configured to detect electrical activity within a target (e.g., the brain). Such electrical activity may include electroencephalogram (EEG) activity and/or any other suitable type of electrical activity as may serve a particular implementation. In some examples, electrodes 908 are all conductively coupled to one another to create a single channel that may be used to detect electrical activity. Alternatively, at least one electrode included in electrodes 908 is conductively isolated from a remaining number of electrodes included in electrodes 908 to create at least two channels that may be used to detect electrical activity.

FIG. 10 shows an illustrative modular assembly 1000 that may implement multimodal measurement system 900. As shown, modular assembly 1000 includes a plurality of modules 1002 (e.g., modules 1002-1 through 1002-3). While three modules 1002 are shown to be included in modular assembly 1000, in alternative configurations, any number of modules 1002 (e.g., a single module up to sixteen or more modules) may be included in modular assembly 1000. Moreover, while each module 1002 has a hexagonal shape, modules 1002 may alternatively have any other suitable geometry (e.g., in the shape of a pentagon, octagon, square, rectangular, circular, triangular, free-form, etc.).

Each module 1002 includes a light source (e.g., light source 1004-1 of module 1002-1 and light source 1004-2 of module 1002-2) and a plurality of detectors (e.g., detectors 1006-1 through 1006-6 of module 1002-1). In the particular implementation shown in FIG. 10, each module 1002 includes a single light source and six detectors. Alternatively, each module 1002 may have any other number of light sources (e.g., two light sources) and any other number of detectors. The various components of modular assembly 1000 shown in FIG. 10 are similar to those described in connection with FIG. 7.

As shown, modular assembly 1000 further includes a plurality of electrodes 1010 (e.g., electrodes 1010-1 through 1010-3), which may implement electrodes 908. Electrodes 1010 may be located at any suitable location that allows electrodes 1010 to be in physical contact with a surface (e.g., the scalp and/or skin) of a body of a user. For example, in modular assembly 1000, each electrode 1010 is on a module surface configured to face a surface of a user's body when modular assembly 1000 is worn by the user. To illustrate, electrode 1010-1 is on surface 1008 of module 1002-1. Moreover, in modular assembly 1000, electrodes 1010 are located in a center region of each module 1002 and surround each module's light source 1004. Alternative locations and configurations for electrodes 1010 are possible.

Figure 11:
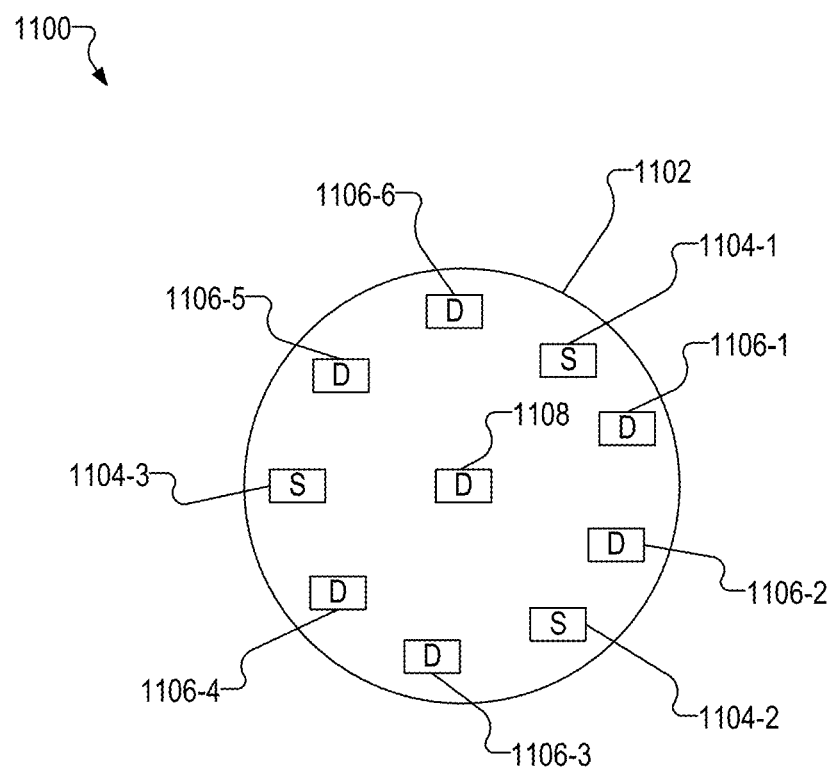
FIG. 11 shows an illustrative module.

FIG. 11 shows an illustrative implementation 1100 of a module 1102 that may be an implementation of any of the modules of the optical measurement systems (e.g., optical measurement system 100, optical measurement system 600, modular assembly 700, multimodal measurement system 900, etc.) described herein. As shown, module 1102 includes light sources 1104 (e.g., light source 1104-1 through 1104-3) and a plurality of detectors 1106 (e.g., detector 1106-1 through 1106-6). Similar to modules 702 (and other modules described herein), detectors 1106 may be configured to detect photon arrival times of photons (e.g., target photons) of light emitted from light sources 1104 after the light is scattered by a target (e.g., a user's head).

Module 1102 further includes a detector (e.g., reference detector 1108) that may be configured to detect photon arrival times of photons (e.g., reference photons) of the light emitted by one or more of light sources 1104 after the light is reflected within module 1102. For instance, when light sources 1104 emit a light pulse toward the target, module 1102 may be configured to reflect some photons (reference photons) of the light to reference detector 1108 instead of toward the target. Module 1102 may be configured to reflect the reference photons to reference detector 1108 in any suitable manner, examples of which are described herein. In some examples, reference detector 1108 may be shielded from target photons so that the arrival times detected by reference detector 1108 correspond strictly to reference photons.

The optical measurement system may be configured to use the reference photon arrival times to generate a histogram that represents an instrument response function (IRF) of the optical measurement system. For example, the optical measurement system may include a controller (e.g., an implementation of any of the controllers described herein) that may be configured to determine the IRF by generating a histogram (e.g., a TPSF) based on the reference photon arrival times of the reference photons reflected within module 1102. Typically, an IRF may be measured during a calibration of a conventional optical measurement system. However, the IRF may change due to various factors, such as temperature and/or other environmental conditions, system conditions (e.g., applied current, circuit characteristics and/or drift, optical component properties, etc.), and/or any other conditions that may affect the optical measurement system. Such changes in the IRF may affect an accuracy in determining characteristics of a target based on histograms, as the IRF may represent a baseline that provides a basis for accurately determining light scattering properties of the target. In some conventional systems, an IRF may be measured before and after a use session and the system may attempt to interpolate any changes in the IRF. However, such interpolations may expend resources to compute and may not be accurate. Additionally or alternatively, conventional systems may record changes in conditions that may affect the IRF and attempt to compensate for such changes using algorithms in post-processing of histograms. Again, however, such calculations may also expend resources and may not be accurate.

In contrast, the optical measurement systems described herein may include modules such as module 1102 that may be configured to direct a portion of the light toward reference detector 1108 for each light pulse emitted by light sources 1104. Consequently, the optical measurement system may determine an IRF with every light pulse emitted or any suitable subset of the light pulses emitted during a use session. Thus, having reference detector 1108 on a module may allow optical measurement system to track any real-time changes in the IRF, such as during operation of the optical measurement system. Such changes may be determined in real time and/or applied in post-processing to the corresponding measurements taken with detectors 1106. Thus, for each set of target photon arrival times of a light pulse directed toward the target, a corresponding measured IRF may be used to generate an accurate histogram that may be analyzed to determine a property of the target.

In some examples, reference detector 1108 may be implemented using a detector that is substantially identical (e.g., in terms of manufacture, design and/or function) to detectors 1106 so that system characteristics that may affect the IRF (e.g., process variation, detector responsivity, etc.) may be minimized. In this manner, the IRF generated based on measurements from reference detector 1108 may be an accurate representation of an IRF that is applied for processing measurements from detectors 1106. Additionally or alternatively, differences in detectors 1106 and reference detector 1108 may be factored into calculations using the IRF. For example, the optical measurement system may measure IRFs using detectors 1106 and reference detector 1108 and determine any differences in the measured IRFs.

As shown in implementation 1100, detectors 1106 may be positioned in a circle around a center of module 1102 (e.g., such that detectors 1106 are each equidistant from the center of module 1102) and reference detector 1108 positioned at or near a center of module 1102. Additionally or alternatively, detectors 1106 and reference detector 1108 may be positioned in any suitable locations and/or configurations on module 1102 such that light may be reflected to reference detector 1108 from light sources 1104 as light sources 1104 direct light toward the target. For example, light sources 1104 may be positioned equidistant from reference detector 1108. Additionally or alternatively, module 1102 may include a plurality of reference detectors 1108, for instance, with a plurality of light sources 1104 positioned equidistant from a respective reference detector 1108.

Figure 12A:
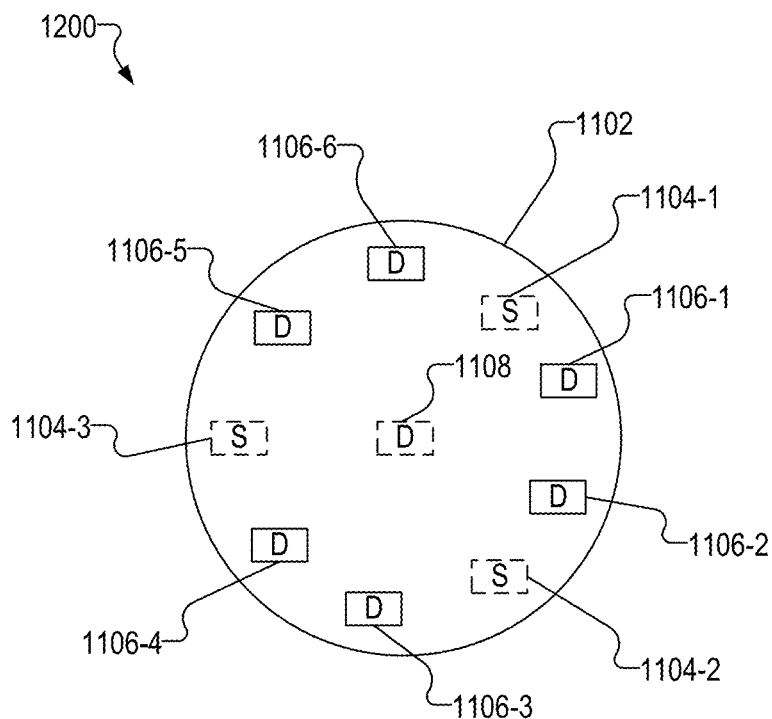
FIG. 12A shows a top view of an illustrative module.
Figure 12B:
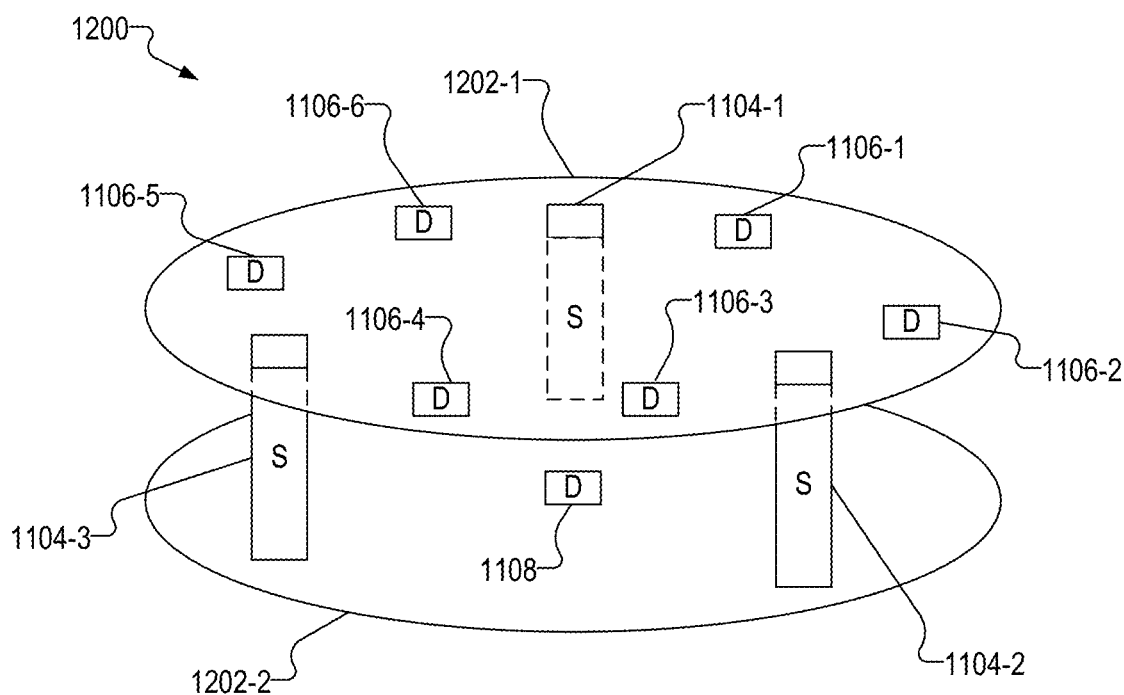
FIG. 12B shows an isometric view of an illustrative module.

For example, FIG. 12A and FIG. 12B show another illustrative implementation 1200 of module 1102. FIG. 12A shows a top view of implementation 1200 while FIG. 12B shows an isometric view of implementation 1200. In implementation 1200, module 1102 may include two layers 1202 of components (e.g., upper layer 1202-1 of components stacked above lower layer 1202-2 of components). For instance, the two layers 1202 may be different printed circuit boards (PCBs), upper layer 1202-1 a PCB including circuitry for detectors 1106 and lower layer 1202-2 a PCB including circuitry for light sources 1104. Thus, as shown, detectors 1106 may be positioned on upper layer 1202-1 while light sources 1104 are positioned on lower layer 1202-2 (but may protrude through or include a light directing component that protrudes through upper layer 1202-1 and out of module 1102 so that light sources 1104 may direct light toward a target).

Further, in implementation 1200, reference detector 1108 may be positioned on lower layer 1202-2. Such a positioning of reference detector 1108 on lower layer 1202-2 may help shield reference detector 1108 from target photons after light emitted by light sources 1104 is reflected off the target. Additionally, reference photons may be directed toward reference detector 1108 in such a configuration using stray light from light sources 1104 such as from coupling inefficiencies between components of each light source 1104. The stray light may reflect off of an underside of upper layer 1202-1 and/or other components between layers 1202 to reach reference detector 1108. Additionally or alternatively, light may be directed toward reference detector 1108 using components configured specifically to reflect some light to reference detector 1108, examples of which are described herein.

Figure 13B:
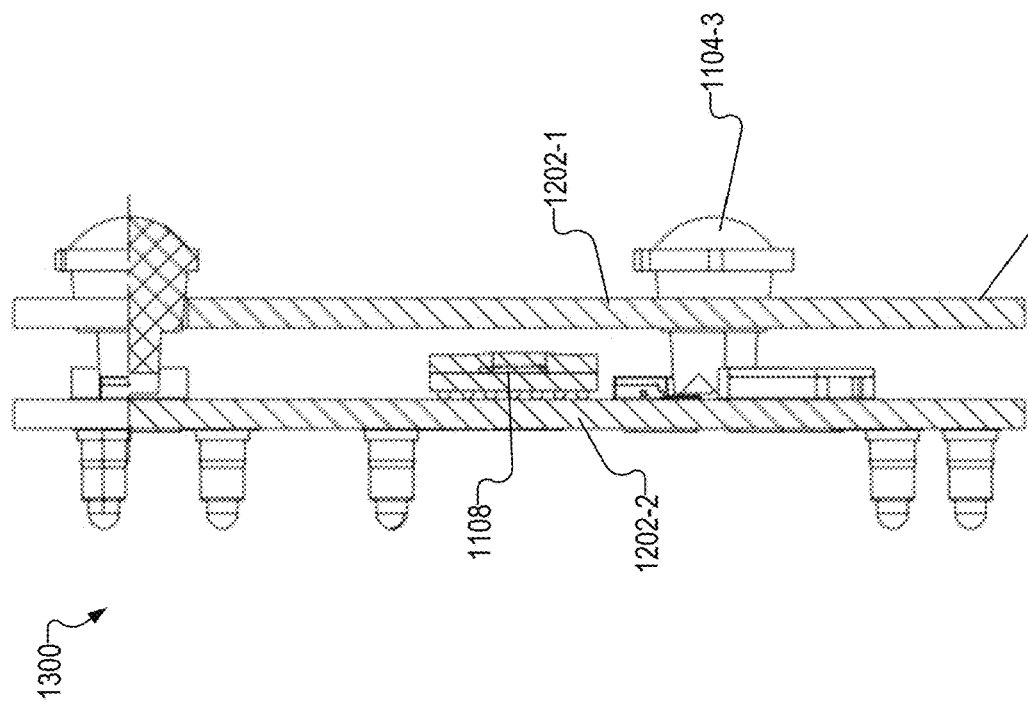
FIG. 13B shows a side view of an illustrative module.
Figure 13A:
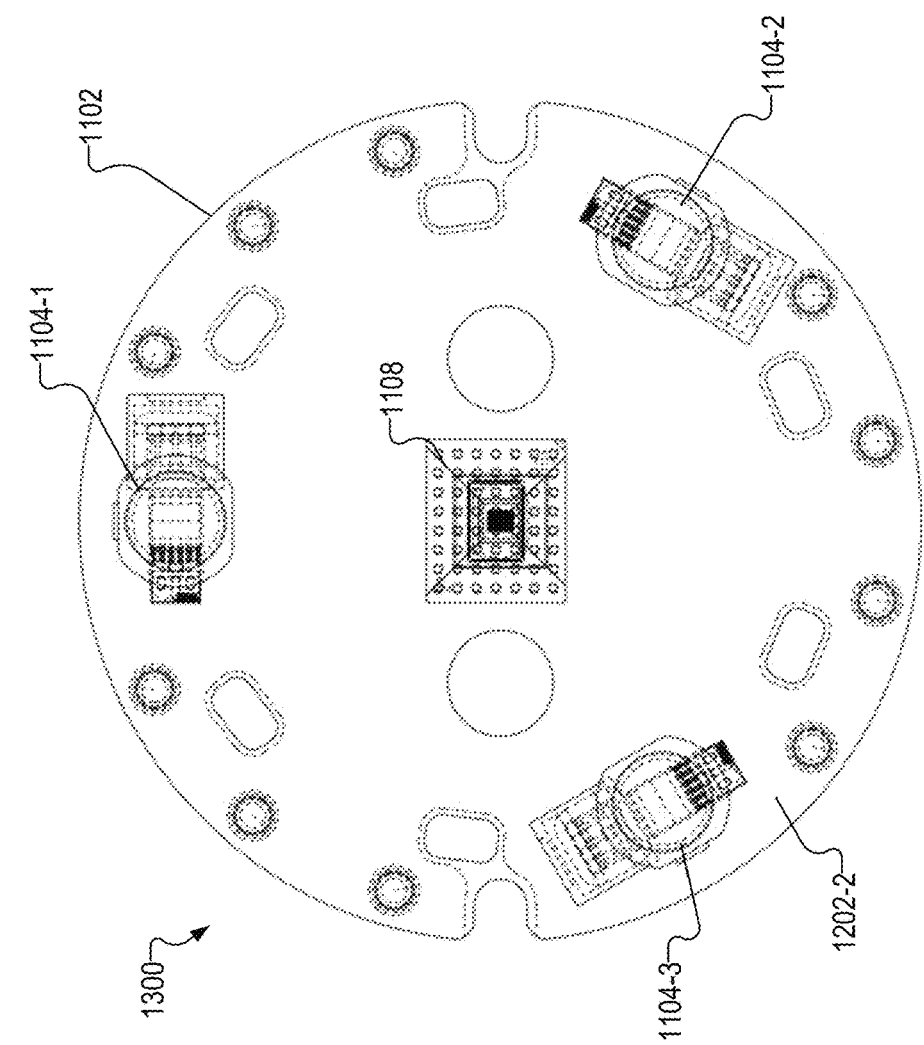
FIG. 13A shows a top view of an illustrative module.
Figure 13C:
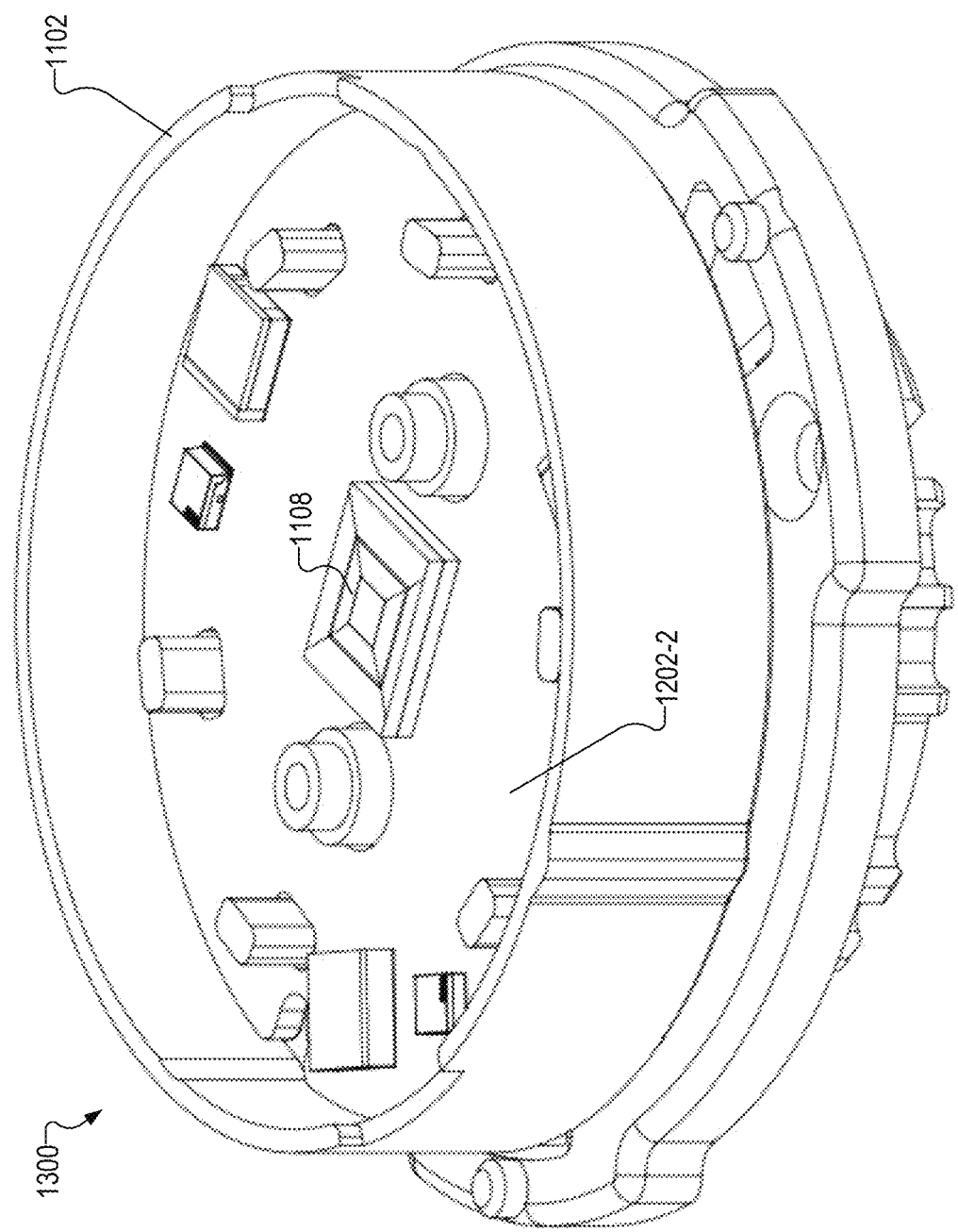
FIG. 13C shows an isometric view of an illustrative module.

FIG. 13A, FIG. 13B, and FIG. 13C show another illustrative implementation 1300 of module 1102. FIG. 13A shows a top view of lower layer 1202-2 of implementation 1300. FIG. 13B shows a cross-sectional side view of implementation 1300. FIG. 13C shows an isometric view of implementation 1300, not showing upper layer 1202-1. Similar to implementation 1200, light sources 1104 and reference detector 1108 may be positioned on lower layer 1202-2. Detectors 1106 may sit on upper layer 1202-1 (not shown).

Light may be directed toward reference detector 1108 by an underside of upper layer 1202-1 and other components on lower layer 1202-2 (and/or in between layers 1202) as module 1102 operates normally, directing light toward a target. During such normal operation, stray light may reach reference detector 1108 from coupling inefficiencies in components of light sources 1104 and by inherent scattering within module 1102. Additionally or alternatively, light may be intentionally deflected toward reference detector 1108 as light sources 1104 emit light pulses toward the target. As described, reference detector 1108 may detect arrival times of reference photons and a controller (which may be included on module 1102 and/or on a different component of the optical measurement system) may determine IRFs of module 1102 based on output from reference detector 1108.

Figure 14B:
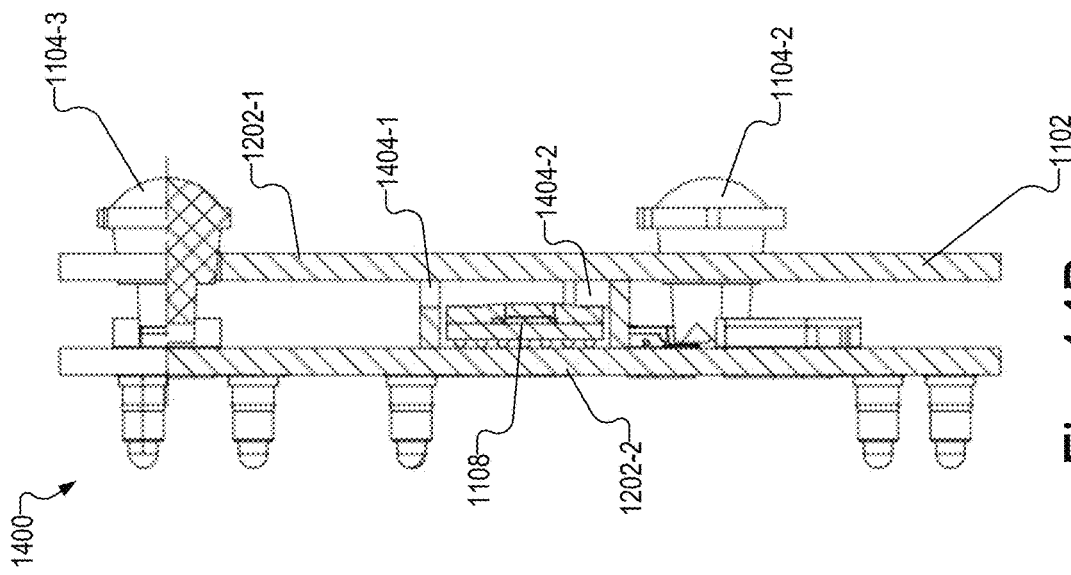
FIG. 14B shows a side view of an illustrative module.
Figure 14A:
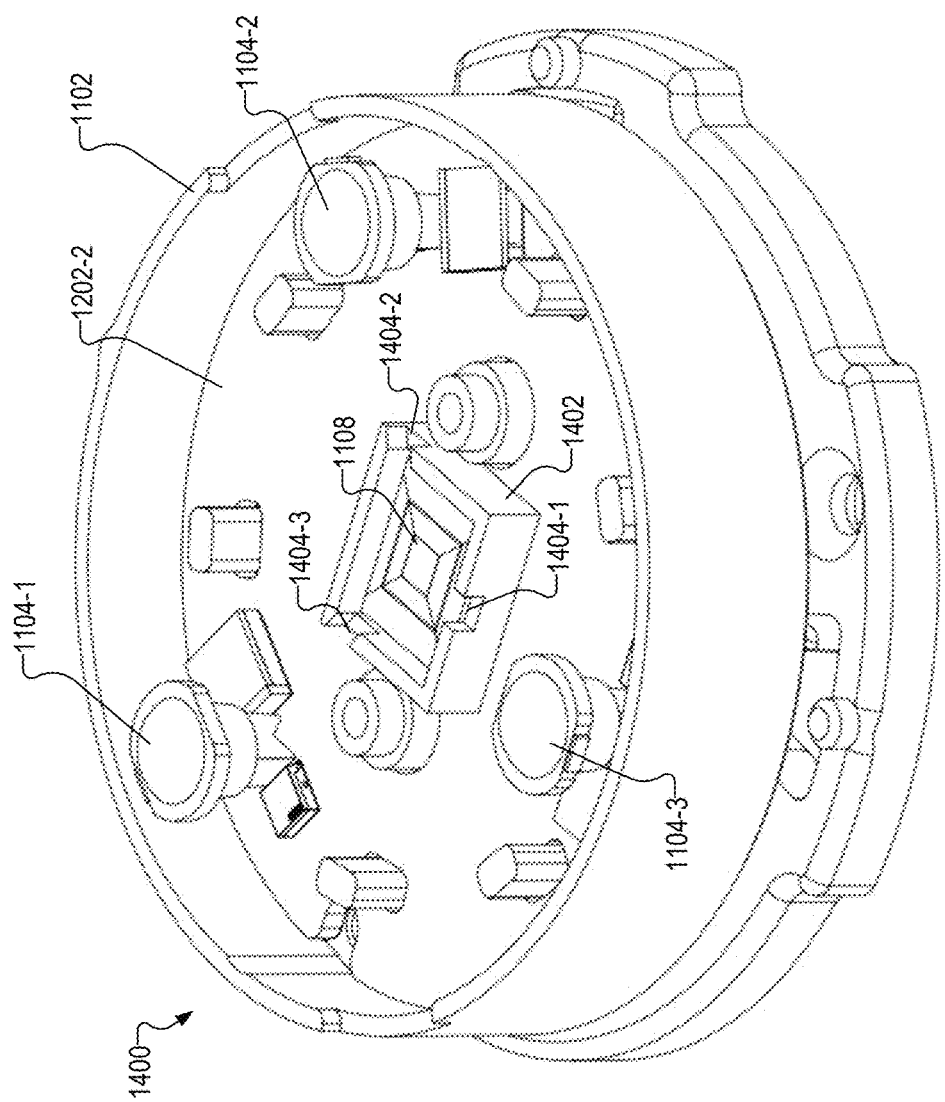
FIG. 14A shows an isometric view of an illustrative module.

FIG. 14A and FIG. 14B show another illustrative implementation 1400 of module 1102. FIG. 14A shows an isometric view of implementation 1400 (not showing upper layer 1202-1) and FIG. 14B shows a cross-sectional side view of implementation 1400. Similar to implementation 1300, light sources 1104 and reference detector 1108 may be positioned on lower layer 1202-2 while detectors 1106 may be positioned on upper layer 1202-1 (not shown).

Implementation 1400 may further include an enclosure 1402 configured to house reference detector 1108. Enclosure 1402 may limit light that is reflected toward reference detector 1108 from reaching reference detector 1108. For example, stray light and inherent scattering from light sources 1104 and components between layers 1202 may result in too much light reaching reference detector 1108. For instance, if reference detector 1108 is implemented with a sensitive photodetector such as a SPAD, not much light may be needed to saturate reference detector 1108, preventing the controller from determining IRFs based on output from reference detector 1108. Thus, enclosure 1402 may be configured to block photons from reaching reference detector 1108.

Instead, enclosure 1402 may include one or more apertures 1404 (e.g., aperture 1404-1 through 1404-3) in one or more walls of enclosure 1402 that allow a controlled amount of light to reach reference detector 1108. Further, apertures 1404 may be adjustable to allow more or less light through apertures 1404. Thus, enclosure 1402 with apertures 1404 may be configured to precisely control how much light reflected within module 1102 reaches reference detector 1108. Apertures 1404 may be adjustable in any suitable manner, such as having an adjustable size, an adjustable light permeability, etc. In some examples, apertures 1404 may be adjusted dynamically during operation of the optical measurement system to ensure an optimal amount of light is reaching reference detector 1108 to determine IRFs with the light pulses emitted by light sources 1104.

Figure 15B:
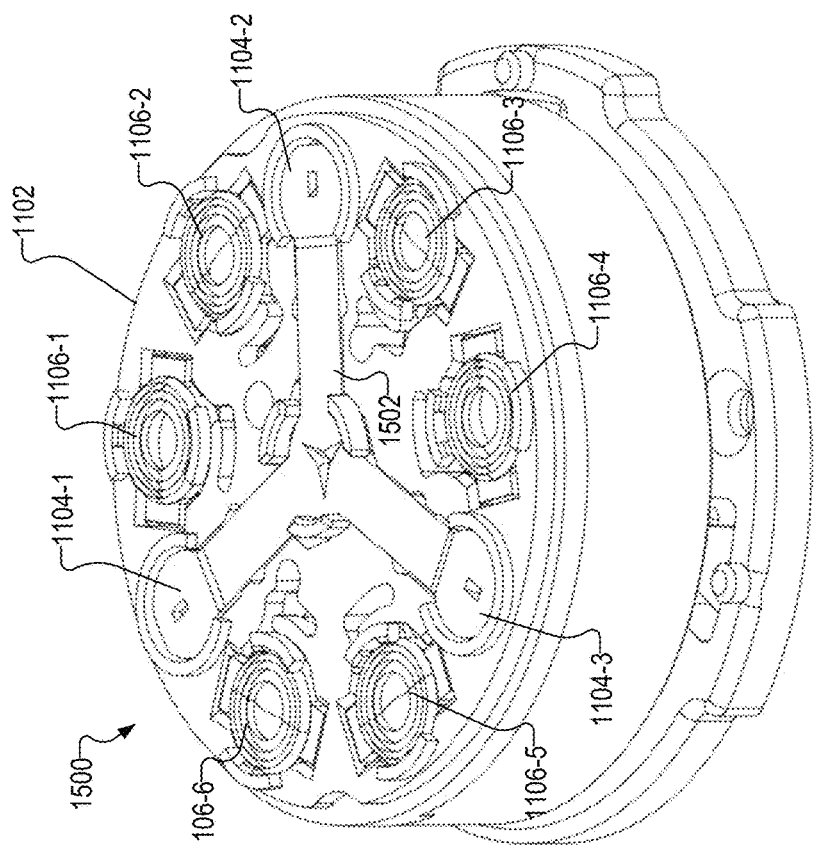
FIG. 15B shows an isometric view of an illustrative module.
Figure 15A:
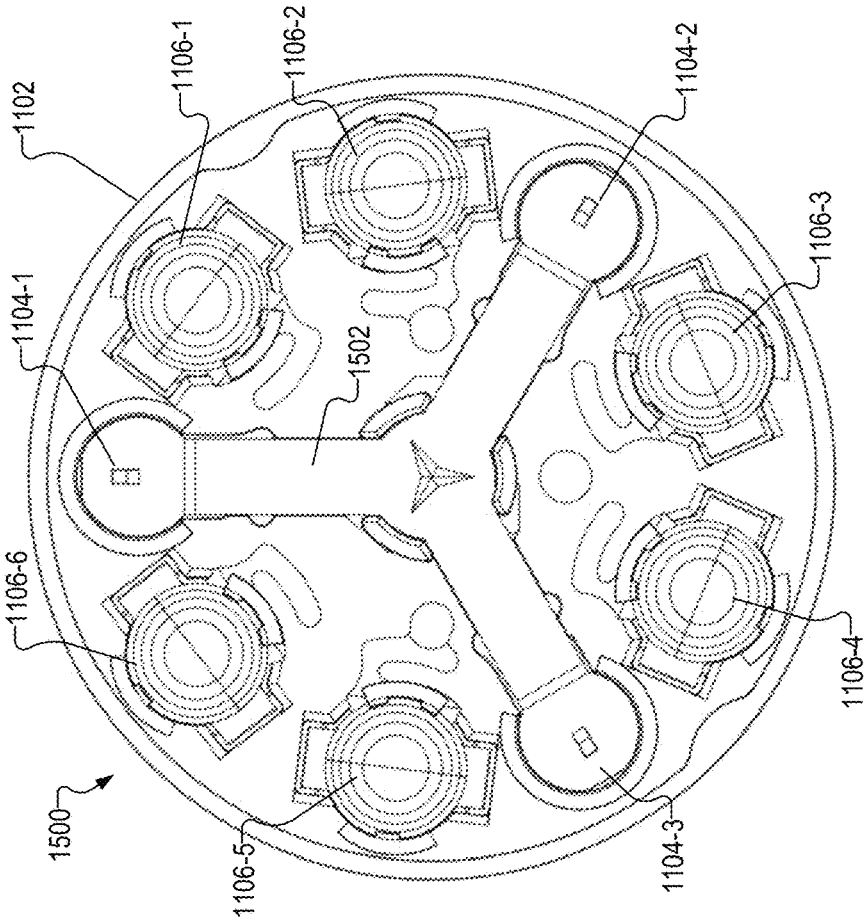
FIG. 15A shows a top view of an illustrative module.

FIG. 15A, FIG. 15B, FIG. 15C, and FIG. 15D show another illustrative implementation 1500 of module 1102. FIG. 15A shows a top view of implementation 1500. FIG. 15B shows an isometric view of implementation 1500. FIG. 15C shows a selectively transparent top view of implementation 1500. FIG. 15D shows a cross-sectional isometric view of implementation 1500.

As seen in FIG. 15D, implementation 1500 may include two layers 1202 of components (e.g., upper layer 1202-1 stacked above lower layer 1202-2). Light sources 1104 may be positioned on lower layer 1202-2 (but may protrude through and/or include components on upper layer 1202-1 and a top of module 1102). Reference detector 1108 may be positioned on upper layer 1202-1 along with detectors 1106.

Further, implementation 1500 may include a waveguide 1502 configured to direct light to reference detector 1108. Waveguide 1502 may be implemented in any suitable manner. For example, for each light source 1104, a portion of waveguide 1502 may be positioned inside light source 1104 (e.g., an optical assembly of light source 1104). For instance, light source 1104 may be implemented as a laser, and an optical element (e.g., a prism, a facet, a beam splitter, etc.) may sit in an optical path of a laser beam generated by the laser. The optical element may be molded and embedded within an optical assembly of light source 1104, such as in the collimated area of the laser beam and/or the diverging area of the laser beam. Additionally or alternatively, waveguide 1502 may include optical fibers to capture and transfer light to reference detector 1108. In any of these ways, light may be deflected from light sources 1104, through channels of waveguide 1502 to a center of waveguide 1502, where the light may be deflected to reference detector 1108 (e.g., using another optical element such as a prism).

Waveguide 1502 may include properties that may be selected to determine how much light is directed toward reference detector 1108. For example, the amount of light may be tuned by adjusting an area of waveguide 1502 that overlaps with the laser beam, a surface finish of waveguide 1502, a design of one or more edges of waveguide 1502 to capture light into waveguide 1502, a type of optical element placed inside light sources 1104, etc. Thus, waveguide 1502 may be configured to direct an optimal amount of light to reference detector 1108 so that reference detector 1108 may generate output data for determining IRFs while in operation.

Figure 16A:
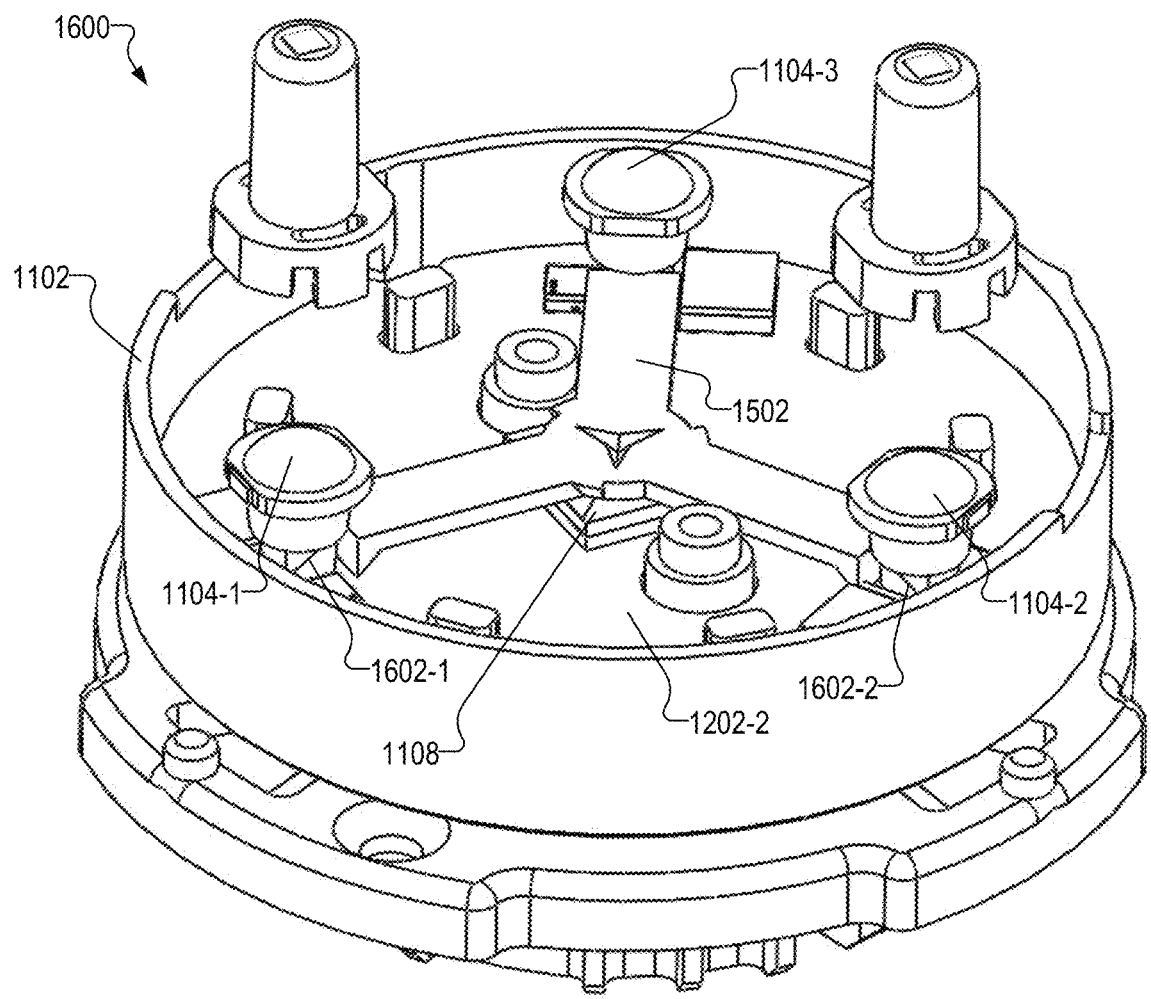
FIG. 16A shows an isometric view of an illustrative module.
Figure 16B:
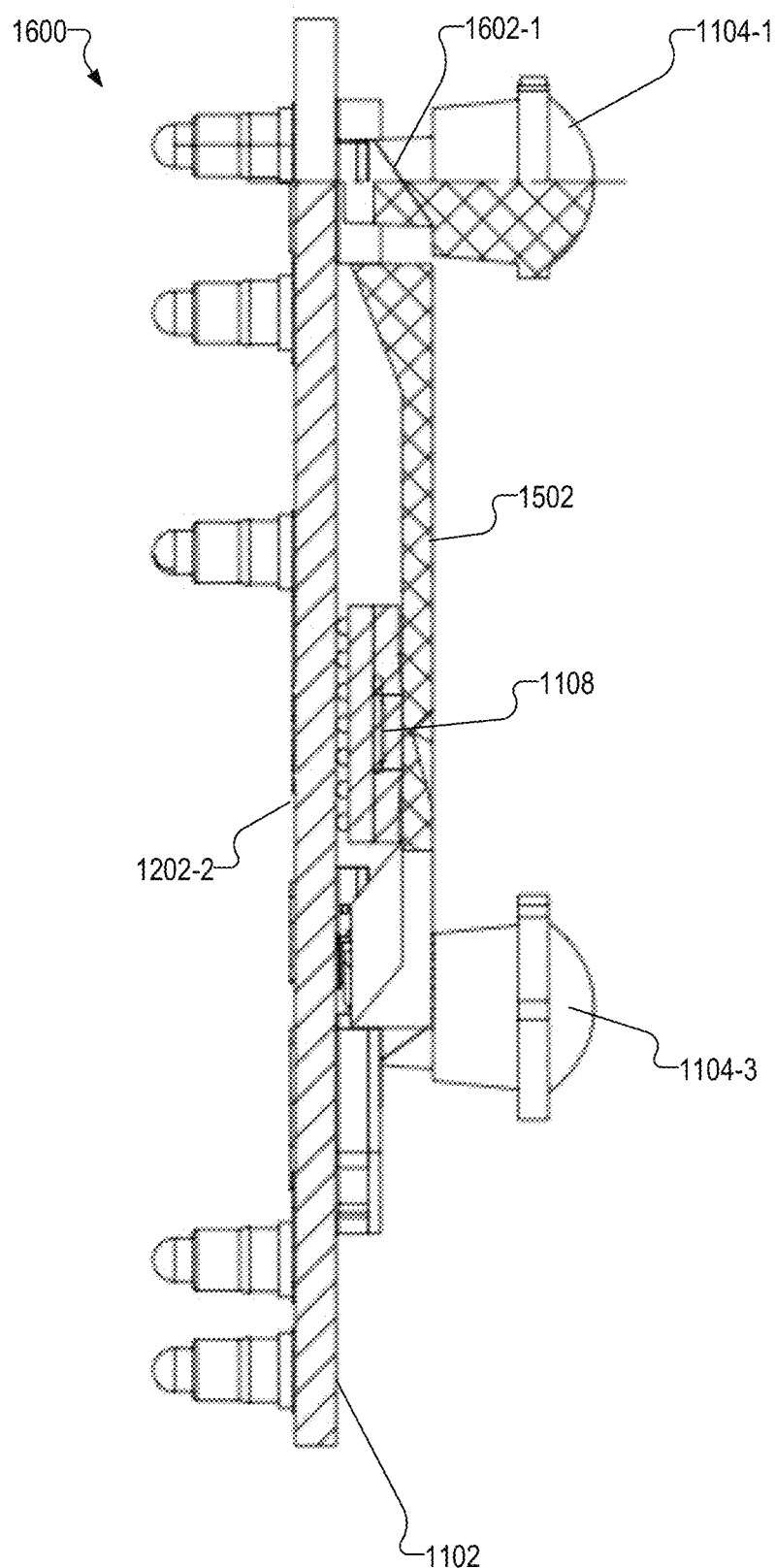
FIG. 16B shows a side view of an illustrative module.

FIG. 16A and FIG. 16B show another illustrative implementation 1600 of module 1102. FIG. 16A shows an isometric view of implementation 1600, not showing upper layer 1202-1. FIG. 16B shows a cross-sectional side view of implementation 1600. Similar to implementation 1500, module 1102 in implementation 1600 includes waveguide 1502 configured to direct light from light sources 1104 to reference detector 1108. However, in implementation 1600, reference detector 1108 is positioned on lower layer 1202-2. Accordingly, waveguide 1502 may be positioned on upper layer 1202-1 or in between layers 1202.

In this example, waveguide 1502 includes optical elements implemented by beam splitters 1602 (e.g., beam splitter 1602-1, beam splitter 1602-2, and beam splitter 1602-3 (not shown)) placed in light sources 1104 to deflect light. Each beam splitter 1602 may be implemented in any suitable manner, such as an optical prism and collimating lens optic. A surface coating of beam splitter 1602 may be tuned to control the amount of light directed from each light source 1104 into each channel of waveguide 1502. Thus, including such an optical element may allow for precise control of the amount of light directed to reference detector 1108 to measure IRFs.

While various implementations depict reference detector 1108 on either upper layer 1202-1 or lower layer 1202-2, in each implementation, reference detector 1108 may be positioned on either of layers 1202, with components (or additional components, fewer components, etc.) configured to reflect light from light sources 1104 to reference detector 1108 positioned accordingly. In some implementations, module 1102 may include additional (e.g., three or more) layers, with components positioned on any of the layers.

An illustrative system may include a module comprising a light source configured to emit light directed at a target, a plurality of detectors configured to detect target photon arrival times of target photons of the light after the light is scattered by the target, and a reference detector configured to detect reference photon arrival times of reference photons of the light after the light is reflected within the module; and a controller configured to determine, based on an output from the reference detector, an instrument response function (IRF) of the module.

An illustrative wearable device may include a wearable assembly; a plurality of modules each configured to be selectively inserted into the wearable assembly, each module included in the plurality of modules comprising a light source configured to emit light directed at a target, a plurality of detectors configured to detect target photon arrival times of target photons of the light after the light is scattered by the target, and a reference detector configured to detect reference photon arrival times of reference photons of the light after the light is reflected within the module; and a controller configured to determine, based on an output from the reference detector, an instrument response function (IRF) of the module.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. Certain features of one embodiment described herein may be combined with or substituted for features of another embodiment described herein. The description and drawings are accordingly to be regarded in an illustrative rather than a restrictive sense.

What is claimed is:

1. An optical measurement system comprising:
a module comprising:
  a light source configured to emit light directed at a target,
  a plurality of detectors configured to detect target photon arrival times of target photons of the light after the light is scattered by the target, and
  a reference detector configured to detect reference photon arrival times of reference photons of the light after the light is reflected within the module; and
a controller configured to determine, based on an output from the reference detector, an instrument response function (IRF) of the module, wherein:
  the module comprises a lower layer of components and an upper layer of components stacked above the lower layer of components within the module,
  the plurality of detectors is positioned on the upper layer,
  the reference detector is positioned on the lower layer, and
  the light reflected within the module comprises light reflected in between the upper layer and the lower layer.

2. The optical measurement system of claim 1, wherein the controller is further configured to:
generate, based on the target photon arrival times and the reference photon arrival times, histogram data associated with the target; and
determine, based on the histogram data, a property of the target.

3. The optical measurement system of claim 1, wherein the reference detector is substantially identical to the plurality of detectors and shielded from the target photons.

4. The optical measurement system of claim 1, wherein:
the module comprises an additional light source configured to emit light directed at the target; and
the light source and the additional light source are positioned equidistant from the reference detector.

5. The optical measurement system of claim 1, wherein:
the light reflected within the module comprises light reflected off of an underside of the upper layer.

6. The optical measurement system of claim 1, further comprising:
an enclosure configured for the reference detector; and
an aperture in a wall of the enclosure configured to allow the light reflected within the module to reach the reference detector.

7. The optical measurement system of claim 6, wherein the aperture is configured to be adjustable to control an amount of the light reflected within the module to reach the reference detector.

8. The optical measurement system of claim 1, wherein the module further comprises a waveguide configured to direct the light reflected within the module to the reference detector.

9. The optical measurement system of claim 8, wherein a portion of the waveguide is positioned inside an optical assembly of the light source.

10. The optical measurement system of claim 9, wherein the portion of the waveguide positioned inside the light source comprises an optical element configured to direct photons of the light through the waveguide.

11. The optical measurement system of claim 10, wherein the optical element comprises a facet configured to reflect the light.

12. The optical measurement system of claim 10, wherein the optical element comprises a beam splitter configured to partially reflect the light.

13. A wearable device comprising:
a wearable assembly;
a plurality of modules each configured to be selectively inserted into the wearable assembly, each module included in the plurality of modules comprising:
  a light source configured to emit light directed at a target,
  a plurality of detectors configured to detect target photon arrival times of target photons of the light after the light is scattered by the target, and
  a reference detector configured to detect reference photon arrival times of reference photons of the light after the light is reflected within the module; and
a controller configured to determine, based on an output from the reference detector, an instrument response function (IRF) of the module, wherein:
  the module comprises a lower layer of components and an upper layer of components stacked above the lower layer of components within the module,
  the plurality of detectors is positioned on the upper layer,
  the reference detector is positioned on the lower layer, and
  the light reflected within the module comprises light reflected in between the upper layer and the lower layer.

14. The wearable device of claim 13, wherein the controller is further configured to:
generate, based on the target photon arrival times and the reference photon arrival times, histogram data associated with the target; and
determine, based on the histogram data, a property of the target.

15. The wearable device of claim 13, wherein the reference detector is substantially identical to the plurality of detectors and shielded from the target photons.

16. The wearable device of claim 13, wherein:
the module comprises an additional light source configured to emit light directed at the target; and
the light source and the additional light source are positioned equidistant from the reference detector.

17. The wearable device of claim 13, wherein:
the light reflected within the module comprises light reflected off of an underside of the upper layer.

18. The wearable device of claim 13, further comprising:
an enclosure configured for the reference detector; and
an aperture in a wall of the enclosure configured to allow the light reflected within the module to reach the reference detector.

19. The wearable device of claim 18, wherein the aperture is configured to be adjustable to control an amount of the light reflected within the module to reach the reference detector.

20. The wearable device of claim 13, wherein the module further comprises a waveguide configured to direct the light reflected within the module to the reference detector.

21. The wearable device of claim 20, wherein a portion of the waveguide is positioned inside an optical assembly of the light source.

22. The wearable device of claim 21, wherein the portion of the waveguide positioned inside the light source comprises an optical element configured to direct photons of the light through the waveguide.

23. The wearable device of claim 22, wherein the optical element comprises a facet configured to reflect the light.

24. The wearable device of claim 22, wherein the optical element comprises a beam splitter configured to partially reflect the light.

* * * * *